(12) United States Patent
Lewis et al.

(10) Patent No.: US 11,409,947 B2
(45) Date of Patent: Aug. 9, 2022

(54) METHOD AND SYSTEM FOR MODIFYING WEB PAGE BASED ON TAGS ASSOCIATED WITH CONTENT FILE

(71) Applicant: Snap-on Incorporated, Kenosha, WI (US)

(72) Inventors: Bradley R. Lewis, Gilroy, CA (US); James J. Morris, Cork (IE); Oswaldo Neri, Los Banos, CA (US); Joshua C. Covington, San Juan Bautista, CA (US)

(73) Assignee: Snap-on Incorporated, Kenosha, WI (US)

( * ) Notice: Subject to any disclaimer, the term of this patent is extended or adjusted under 35 U.S.C. 154(b) by 84 days.

(21) Appl. No.: 16/986,797

(22) Filed: Aug. 6, 2020

(65) Prior Publication Data
US 2020/0364395 A1    Nov. 19, 2020

Related U.S. Application Data

(63) Continuation of application No. 16/201,798, filed on Nov. 27, 2018, now Pat. No. 10,817,654.

(51) Int. Cl.
*G06F 40/14* (2020.01)
*G06F 40/197* (2020.01)
(Continued)

(52) U.S. Cl.
CPC .......... *G06F 40/14* (2020.01); *G06F 16/9537* (2019.01); *G06F 16/9577* (2019.01);
(Continued)

(58) Field of Classification Search
CPC .... G06F 40/14; G06F 40/197; G06F 16/9577; G06F 16/9537
See application file for complete search history.

(56) References Cited

U.S. PATENT DOCUMENTS 6,374,260 B1    4/2002 Hoffert et al.
8,745,018 B1    6/2014 Singleton et al.
(Continued)

FOREIGN PATENT DOCUMENTS

KR    10-2007-0115194    12/2007

OTHER PUBLICATIONS

Bhagwan, Varun et al. "JaberWocky: Crowd-Sourcing Metadata for Files", IEEE 2009, p. 513-516 (Year: 2009).*

(Continued)

*Primary Examiner* — Stephen S Hong
*Assistant Examiner* — Nicholas Hasty
(74) *Attorney, Agent, or Firm* — McDonnell Boehnen Hulbert & Berghoff LLP

(57) ABSTRACT

A method includes receiving a web-page with a search bar and a first set of card(s) including file(s) of a first set of content files. The method includes transmitting an indication the search bar was selected and receiving tag array(s) associated with a second set of content files. The method includes displaying, within an expanded search bar, tag array(s) including a first tag array associated with file(s) among the second set of files, and transmitting an indication the first tag array was selected from within the search bar, and receiving a third set of content files for populating card(s) on a modified web-page. Each file of the third set of files includes a file most-recently downloaded to a server and associated with the first tag array. The method includes displaying the modified web-page, including a second set of one or more cards including file(s) of the third set of files.

32 Claims, 20 Drawing Sheets

(51) Int. Cl.
  *G06F 16/957* (2019.01)
  *G06F 16/9537* (2019.01)
  *G06F 3/0482* (2013.01)
  *H04L 67/02* (2022.01)
(52) U.S. Cl.
  CPC .......... *G06F 40/197* (2020.01); *G06F 3/0482* (2013.01); *H04L 67/02* (2013.01)

(56) References Cited

U.S. PATENT DOCUMENTS

| | | | |
|---|---|---|---|
| 8,819,030 B1* | 8/2014 | Freed | G06F 16/164 707/748 |
| 8,949,250 B1 | 2/2015 | Garg et al. | |
| 8,990,235 B2 | 3/2015 | King et al. | |
| 9,294,537 B1* | 3/2016 | Zuccarino | H04L 67/02 |
| 2007/0078832 A1 | 4/2007 | Ott, IV et al. | |
| 2007/0174247 A1* | 7/2007 | Xu | G06F 40/169 |
| 2008/0071749 A1 | 3/2008 | Schloter | |
| 2008/0201645 A1 | 8/2008 | Francis et al. | |
| 2008/0208692 A1 | 8/2008 | Garaventi et al. | |
| 2009/0222720 A1 | 9/2009 | Drieschner | |
| 2009/0303676 A1 | 12/2009 | Behar et al. | |
| 2010/0082575 A1 | 4/2010 | Walker et al. | |
| 2011/0016150 A1* | 1/2011 | Engstrom | G06F 16/58 707/778 |
| 2012/0203767 A1 | 8/2012 | Williams et al. | |
| 2012/0324002 A1 | 12/2012 | Chen | |
| 2013/0132209 A1 | 5/2013 | Belwadi et al. | |
| 2014/0067825 A1 | 3/2014 | Oztaskent et al. | |
| 2014/0189541 A1 | 7/2014 | Chen et al. | |
| 2014/0282136 A1 | 9/2014 | Marantz et al. | |
| 2014/0359505 A1 | 12/2014 | Cisler et al. | |
| 2014/0365950 A1 | 12/2014 | Jegal et al. | |
| 2015/0213492 A1 | 7/2015 | Aleksandrovsky | |
| 2015/0317945 A1 | 11/2015 | Andress et al. | |
| 2016/0098164 A1 | 4/2016 | Fey et al. | |
| 2016/0295134 A1* | 10/2016 | Beall | G06T 7/33 |
| 2017/0098200 A1 | 4/2017 | Merg et al. | |
| 2017/0140006 A1 | 5/2017 | Yang | |
| 2017/0351386 A1 | 12/2017 | Shurtleff et al. | |
| 2018/0054499 A1 | 2/2018 | Greenberg | |
| 2018/0129637 A1* | 5/2018 | Lantwin | G06F 40/151 |
| 2019/0018884 A1 | 1/2019 | Wakankar et al. | |
| 2019/0286683 A1 | 9/2019 | Kittur et al. | |
| 2020/0167410 A1 | 5/2020 | Lewis et al. | |

OTHER PUBLICATIONS

D. Kwak, R. Liu, D. Kim, B. Nath and L. Iftode, "Seeing is Believing: Sharing Real-Time Visual Traffic Information via Vehicular Clouds," in IEEE Access, vol. 4, pp. 3617-3631, 2016 (Year: 2016).*

Hunter, Jane et al. "Co-Annotea: A system for Tagging Relationships Between Multiple Mixed-Media Objects" 2008 IEEE p. 42-53 (Year: 2008).*

Kwak, Daehan et al. "Seeing is Believing: Sharing Real-Time Visual Traffic Information via Vehicular Clouds" 2016 IEEE Access, vol. 4 p. 3617-3631 (Year: 2016).*

International Searching Authority, at European Patent Office; International Search Report and Written Opinion for international application No. PCT/US2019/062770, and notification of transmittal; 17 pages; dated Feb. 21, 2020.

* cited by examiner

```
<CustomMetadata>
<title>2019 Acme Beta 6.6L V8 SFI </title>
<description>Diagnostic Scan</description>
<tags>
        <tag type "1">Zeus Diagnostic and Information System</tag>
        <tag type "1">1GR22ETS56YE765432</tag>
        <tag type "1">Acme</tag>
        <tag type "1">2019</tag>
        <tag type "1">Beta</tag>
        <tag type "1">6.6L V8 SFI</tag>
        <tag type "1">SFT</tag>
        <tag type "1">Service Report</tag>
</tags>
<country>United States</country>
<language>English</language>
<vehicleData>
        <year>2019</year>
        <make>Acme</make>
        <model>Beta</model>
        <engine>6.6 L V8</engine>
        <VIN>1GR22ETS56YE765432</VIN>
</vehicleData>
</CustomMetadata>
```

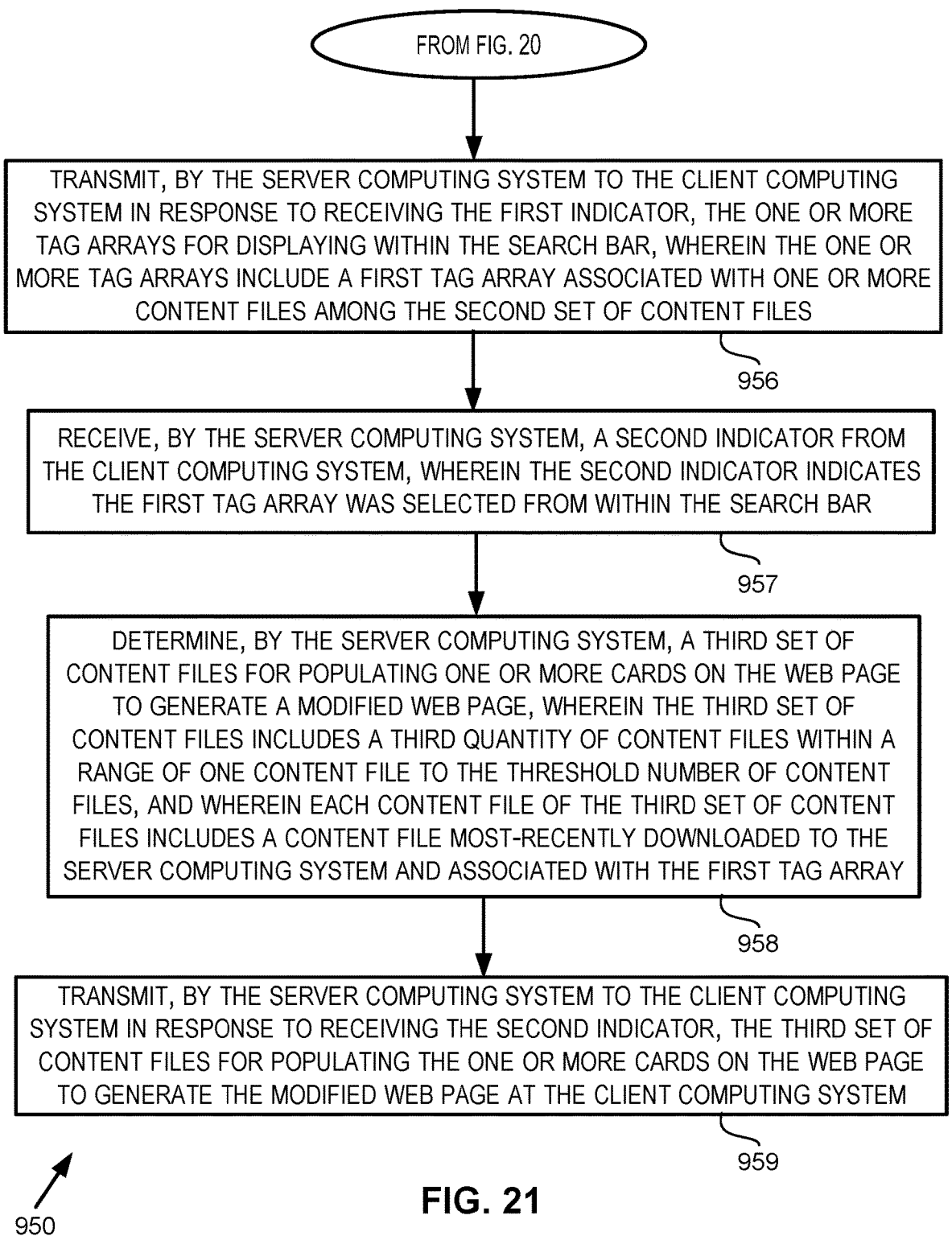

US 11,409,947 B2

METHOD AND SYSTEM FOR MODIFYING WEB PAGE BASED ON TAGS ASSOCIATED WITH CONTENT FILE

REFERENCE TO RELATED APPLICATION

This application is a continuation application of U.S. patent application Ser. No. 16/201,798 filed on Nov. 27, 2018. U.S. patent application Ser. No. 16/201,798 was published on May 28, 2020 as United States Patent Application Publication No. US 2020/0167410 A1. U.S. patent application Ser. No. 16/201,798 and United States Patent Application Publication No. US 2020/0167410 A1 are incorporated herein by reference.

BACKGROUND

The internet is a global network of computing systems. The World Wide Web is an arrangement for accessing information using the internet. A web browser is an application, executable on a computing system. A web browser can be arranged for retrieving information from the World Wide Web using the internet. As an example, the information retrieved using a web browser can include a hypertext markup language (HTML) file, an audio file, a video file, an image file, a map, and/or a text file, among other information. Some web browsers include a search bar into which a user can type text characters, such as a uniform resource locator or a search term, using a keyboard. The uniform resource locator can, for example, include a retrieval protocol identifier (e.g., http, https, or ftp), an internet protocol address or domain name, and a path name to a resource at the specified address or domain. Alternatively, for some web browsers, a user can enter text characters into the search bar by speaking into a microphone, copying and pasting text using a computer mouse, or selecting a prior text entry that appears in the search bar after the user enters text into the search bar using another text entry method, such as typing text characters using a keyboard. Current web browsers do not populate an expanded portion of a search bar with text characters in response to selecting the search bar.

OVERVIEW

In a first implementation, a method is provided. The method includes receiving, by a client computing system from a server computing system, a web page and a first set of content files. The first set of content files includes a first quantity of content files within a range of one content file to a threshold number of content files. The client computing system is configured to execute a web browser. The method includes displaying the web page on a display of the client computing system. The web page includes a search bar and a first set of one or more cards. Each card of the first set of one or more cards includes one or more content files of the first set of content files. The method also includes transmitting, by the client computing system while displaying the web page, a first indicator to the server computing system. The first indicator indicates the search bar on the web page at the client computing system was selected. The method also includes receiving, by the client computing system in response to transmitting the first indicator, one or more tags arrays associated with a second set of content files. The second set of content files includes a second quantity of content files within the range of one content file to the threshold number of content files. The method also includes displaying, on the display, the one or more tags arrays within an expanded portion of the search bar. The one or more tag arrays include a first tag array associated with one or more content files among the second set of content files. The method also includes transmitting, by the client computing system, a second indicator to the server computing system. The second indicator indicates the first tag array was selected from within the expanded portion of the search bar. Furthermore, the method includes receiving, by the client computing system, a third set of content files for populating one or more cards on the web page to generate a modified web page. The third set of content files includes a third quantity of content files within a range of one content file to the threshold number of content files. Each content file of the third set of content files includes a content file most-recently downloaded to the server computing system and associated with the first tag array. Furthermore still, the method includes displaying, on the display, the modified web page. Displaying the modified web page includes displaying on the display a second set of one or more cards. Each card of the second set of one or more cards includes one or more content files of the third set of content files.

In a second implementation, a computing system is provided. The computing system includes a display, a computer-readable memory having stored thereon a web browser, and one or more processors configured to execute the web browser. The one or more processors are programmed to receive, from a server computing system, a web page and a first set of content files. The first set of content files includes a first quantity of content files within a range of one content file to a threshold number of content files. The one or more processors are programmed to display the web page on the display. The web page includes a search bar and a first set of one or more cards. Each card of the first set of one or more cards includes one or more content files of the first set of content files. The one or more processors are also programmed to receive, in response to transmitting the first indicator, one or more tags arrays associated with a second set of content files. The second set of content files includes a second quantity of content files within the range of one content file to the threshold number of content files. The one or more processors are also programmed to display, on the display, the one or more tags arrays within the an expanded portion of the search bar. The one or more tag arrays include a first tag array associated with one or more content files among the second set of content files. The one or more processors are also programmed to transmit a second indicator to the server computing system. The second indicator indicates the first tag array was selected from within the expanded portion of the search bar. Furthermore, the one or more processors are also programmed to receive a third set of content files for populating one or more cards on the web page to generate a modified web page. The third set of content files includes a third quantity of content files within a range of one content file to the threshold number of content files. Each content file of the third set of content files includes a content file most-recently downloaded to the server computing system and associated with the first tag array. Furthermore still, the one or more processors are also programmed to display, on the display, the modified web page, wherein displaying the modified web page includes displaying on the display a second set of one or more cards. Each card of the second set of one or more cards includes one or more content files of the third set of content files.

In a third implementation, a computer-readable medium is provided. The computer readable medium stores thereon instructions executable by one or more processors to cause a computing system to perform functions. The functions include receiving, by a client computing system from a server computing system, a web page and a first set of content files. The first set of content files includes a first quantity of content files within a range of one content file to a threshold number of content files. The computing system is configured to execute a web browser. The functions include displaying the web page on a display of the computing system. The web page includes a search bar and a first set of one or more cards. Each card of the first set of one or more cards includes one or more content files of the first set of content files. The functions also include transmitting, by the computing system while displaying the web page, a first indicator to the server computing system. The first indicator indicates the search bar on the web page at the client computing system was selected. The functions also include receiving, by the computing system in response to transmitting the first indicator, one or more tags arrays associated with a second set of content files. The second set of content files includes a second quantity of content files within the range of one content file to the threshold number of content files. The functions also include displaying, on the display, the one or more tags arrays within an expanded portion of the search bar. The one or more tag arrays include a first tag associated with one or more content files among the second set of content files. The functions also include transmitting, by the client computing system, a second indicator to the server computing system. The second indicator indicates the first tag array was selected from within the expanded portion of the search bar. Furthermore, the functions include receiving, by the client computing system, a third set of content files for populating one or more cards on the web page to generate a modified web page. The third set of content files includes a third quantity of content files within a range of one content file to the threshold number of content files. Each content file of the third set of content files includes a content file most-recently downloaded to the server computing system and associated with the first tag array. Furthermore still, the functions include displaying, on the display, the modified web page. Displaying the modified web page includes displaying on the display a second set of one or more cards. Each card of the second set of one or more cards includes one or more content files of the third set of content files.

In a fourth implementation, a method is provided. The method includes receiving, by a server computing system from a client computing system, a request for a web page. The web page is configured to display a search bar and one or more cards for presenting a number of content files ranging from one content file to a threshold number of content files. The method also includes determining, by the server computing system, a first set of content files for use in populating the one or more cards on the web page. The first set of content files includes a first quantity of content files within a range of one content file to the threshold number of content files. The method also includes transmitting, by the server computing system to the client computing system in response to receiving the request, the web page and the first set of content files for use in populating the one or more cards on the web page. The method also includes receiving, by the server computing system, a first indicator. The first indicator indicates the search bar was selected on the web page at the client computing system. The method also includes determining, by the server computing system, one or more tags arrays associated with a second set of content files. The second set of content files includes a second quantity of content files within the range of one content file to the threshold number of content files. The method also includes transmitting, by the server computing system to the client computing system in response to receiving the first indicator, the one or more tag arrays for displaying within an expanded portion of the search bar. The one or more tag arrays include a first tag array associated with one or more content files among the second set of content files. The method also includes receiving, by the server computing system, a second indicator from the client computing system. The second indicator indicates the first tag array was selected from within the expanded portion of the search bar. Furthermore, the method includes determining, by the server computing system, a third set of content files for populating one or more cards on the web page to generate a modified web page. The third set of content files includes a third quantity of content files within a range of one content file to the threshold number of content files. Each content file of the third set of content files includes a content file most-recently downloaded to the server computing system and associated with the first tag array. Furthermore still, the method includes transmitting, by the server computing system to the client computing system in response to receiving the second indicator, the third set of content files for populating the one or more cards on the web page to generate the modified web page at the client computing system.

In a fifth implementation, a computing system is provided. The computing system includes a computer-readable memory having stored thereon a database and one or more processors configured to access the database. The one or more processors are programmed to receive, from a client computing system, a request for a web page. The web page is configured to display a search bar and one or more cards for presenting a number of content files ranging from one content file to a threshold number of content files. The one or more processors are also programmed to determine a first set of content files for use in populating the one or more cards on the web page. The first set of content files includes a first quantity of content files within a range of one content file to the threshold number of content files. The one or more processors are also programmed to transmit, to the client computing system in response to receiving the request, the web page and the first set of content files for use in populating the one or more cards on the web page. The one or more processors are also programmed to receive a first indicator. The first indicator indicates the search bar was selected on the web page at the client computing system. The one or more processors are also programmed to determine one or more tags arrays associated with a second set of content files. The second set of content files includes a second quantity of content files within the range of one content file to the threshold number of content files. The one or more processors are also programmed to transmit, to the client computing system in response to receiving the first indicator, the one or more tag arrays for displaying within an expanded portion of the search bar. The one or more tag arrays include a first tag array associated with one or more content files among the second set of content files. The one or more processors are also programmed to receive a second indicator from the client computing system. The second indicator indicates the first tag array was selected from within the expanded portion of the search bar. Furthermore, the one or more processors are also programmed to determine a third set of content files for populating one or more cards on the web page to generate a modified web page. The third set of content files includes a third quantity of content files within a range of one content file to the threshold number of content files. Each content file of the third set of content files includes a content file most-recently downloaded to the server computing system and associated with the first tag array. Furthermore still, the one or more processors are also programmed to transmit, to the client computing system in response to receiving the second indicator, the third set of content files for populating the one or more cards on the web page to generate the modified web page at the client computing system.

In a sixth implementation, a computer-readable medium is provided. The computer readable medium stores thereon instructions executable by one or more processors to cause a computing system to perform functions. The functions include receiving, by a server computing system from a client computing system, a request for a web page. The web page is configured to display a search bar and one or more cards for presenting a number of content files ranging from one content file to a threshold number of content files. The functions also include determining, by the server computing system, a first set of content files for use in populating the one or more cards on the web page. The first set of content files includes a first quantity of content files within a range of one content file to the threshold number of content files. The functions also include transmitting, by the server computing system to the client computing system in response to receiving the request, the web page and the first set of content files for use in populating the one or more cards on the web page. The functions also include receiving, by the server computing system, a first indicator. The first indicator indicates the search bar was selected on the web page at the client computing system. The functions also include determining, by the server computing system, one or more tags arrays associated with a second set of content files. The second set of content files includes a second quantity of content files within the range of one content file to the threshold number of content files. The functions also include transmitting, by the server computing system to the client computing system in response to receiving the first indicator, the one or more tag arrays for displaying within an expanded portion of the search bar. The one or more tag arrays include a first tag array associated with one or more content files among the second set of content files. The functions also include receiving, by the server computing system, a second indicator from the client computing system. The second indicator indicates the first tag array was selected from within the expanded portion of the search bar. Furthermore, the functions include determining, by the server computing system, a third set of content files for populating one or more cards on the web page to generate a modified web page. The third set of content files includes a third quantity of content files within a range of one content file to the threshold number of content files. Each content file of the third set of content files includes a content file most-recently downloaded to the server computing system and associated with the first tag array. Furthermore still, the functions include transmitting, by the server computing system to the client computing system in response to receiving the second indicator, the third set of content files for populating the one or more cards on the web page to generate the modified web page at the client computing system.

Other implementations will become apparent to those of ordinary skill in the art by reading the following detailed description, with reference where appropriate to the accompanying drawings.

BRIEF DESCRIPTION OF THE DRAWINGS

Example implementations are described herein with reference to the drawings.

FIG. 17 shows example metadata in accordance with the example implementations.

FIG. 20 and FIG. 21 depict a flow chart showing an example method in accordance with the example implementations.

DETAILED DESCRIPTION

I. Introduction

This description describes several example implementations, at least some which pertain to a server computing system providing a web page to a client computing system, and the client computing system displaying the web page on a display. The web page can include a selectable search bar. The client computing system can determine the search bar has been selected and provide the server computing system with an indicator that indicates the search bar was selected. The server computing system can determine one or more tag arrays for displaying in an expanded portion of the search bar of the web page. The client computing system can receive the one or more tag arrays and populate the one or more tag arrays in the expanded portion of the search bar. The client computing system can determine a tag array displayed in the expanded portion of the search bar was selected and notify the server computing system which tag array was selected and populate the search bar with the tag array selected from the expanded portion of the search bar. The server computing system can provide the client computing system with a number of content files associated with the tags of the selected tag array. The client computing system can display the content files within a card on the web page.

In some implementations, the one or more tag arrays shown in the expanded portion of the search bar are tag arrays associated with content files most-recently generated and/or received by server computing system. In those or in other implementations, the one or more tag arrays shown in the expanded portion of the search bar are tag arrays associated with content files currently displayed on a web page at the client computing system. In any of those or in other implementations, a web page displayed on the client computing system can be modified to show particular content files in response to selecting a tag array from the expanded portion of the search bar on the web page.

In some implementations, the expanded portion of the search bar is arranged as a drop-down list of tag arrays and/or prior search text strings positioned below the search bar. In at least some other implementations, the expanded portion of the search bar is arranged as a rise-up list of tag arrays and/or prior search text strings positioned above the search bar.

II. Example Systems

Figure 1:
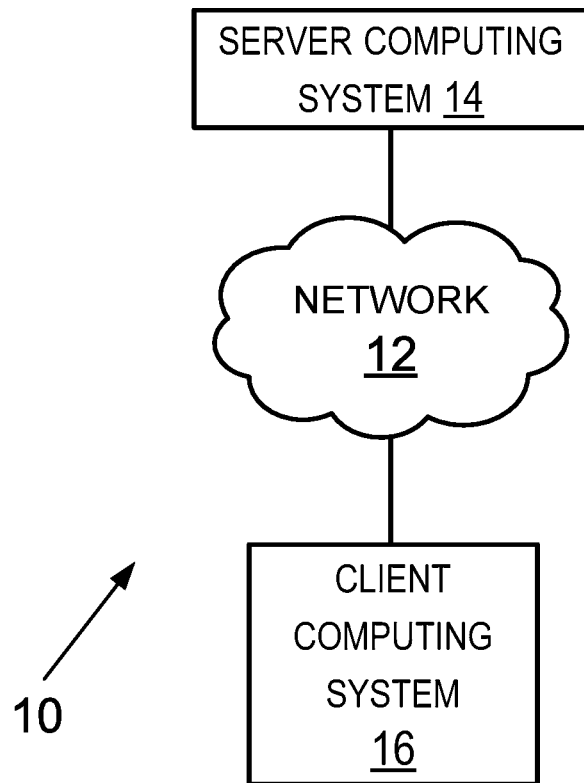
FIG. 1, FIG. 2, and FIG. 3 are block diagrams showing systems in accordance with the example implementations.

FIG. 1 shows a block diagram of a system 10 in accordance with example implementations. The system 10 includes a network 12, a server computing system 14, and a client computing system 16. Any server computing system described in this description or shown in a figure can be referred to as a server. Similarly, any client computing system described in this description or shown in a figure can be referred to as a client.

The network 12 can include one communication network or multiple communication networks. Two or more of the multiple communication networks can be operatively coupled to each other. A communication network of the network 12 can carry communications over a wired communication network and/or a wireless communication network. In some implementations, a communication network of the network 12 includes a circuit-switched digital network and/or a packet-switched network. The network 12 includes multiple network devices. As an example, a network device on the network 12 can include an access point, an antenna, a base station, a gateway, a hub, a modem, a network cable, a network interface card, a relay, a receiver, a router, a switch, a transceiver, and/or a transmitter. Any one or more of those network devices can be installed in the network 12 as an intermediary network device. The server computing system 14 and the client computing system 16 are examples of network devices operatively coupled to the network 12. Other examples of a network device operatively coupled to the network 12 are also possible.

In some implementations, the network 12 includes a local area network (LAN) and/or a wide area network (WAN). The LAN and/or WAN can carry data using packet-switched or circuit-switched technologies. The LAN and/or WAN can include an air interface or a wire to carry the data. The network 12 can include a network or at least a portion of a network that carries out communications using a Transmission Control Protocol (TCP) and the Internet Protocol (IP), such as the communication network commonly referred to as the Internet. The network 12 can provide the client computing system 16 with a path to access information stored on the World Wide Web at the server computing system 14. As an example, the information can include a web page, a content file, and metadata regarding the content file.

The server computing system 14 can be configured to provide a web service to the client computing system 16 using the network 12. As an example, the server computing system 14 can receive a request from the client computing system 16 and the client computing system 16 can receive from the server computing system 14 a response to the request. The request can include a request for a web page or a request for tag arrays associated with content files. Other examples of a request transmitted by the client computing system 16 are described below.

In an example implementation, the client computing system 16 can generate a file, such as an image file, a text file, an audio file, or a video file. The client computing system 16 can include an executable application to generate the file and file metadata regarding the file. As an example, the file metadata can include a file name, a time stamp indicative of when the file was created, a display resolution, and/or a file size. The time stamp can, but need not necessarily, indicate a date and/or a time-of-day value.

Figure 2:
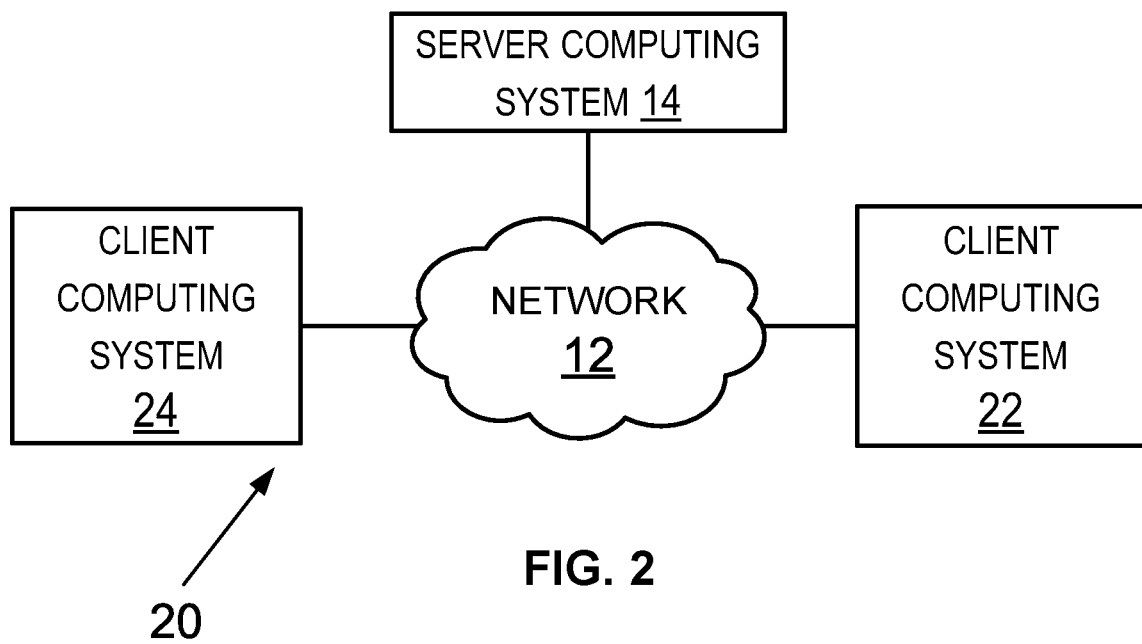

Next, FIG. 2 shows a block diagram of a system 20 in accordance with example implementations. The system 20 includes the network 12, the server computing system 14, and a client computing system 22, 24. In accordance with the example implementations, a client computing system, such as the client computing system 22, can generate a content file and metadata regarding the content file. Moreover, the client computing system 22 can transmit the content file and the metadata onto the network 12 for transmission to the server computing system 14. Furthermore, a client computing system, such as the client computing system 24, can request and receive from the server computing system 14 the content file and/or the metadata transmitted to the server computing system 14 from the client computing system 22. The client computing system 22, 24 are further examples of network devices.

In some implementations, the client computing system 16, 22, 24 is implemented as and/or includes a portion of a small-form factor portable (i.e., mobile) electronic device such as a smartphone (e.g., an IPHONE® smartphone from Apple Inc. of Cupertino, Calif., or a GALAXY S® smartphone from Samsung Electronics Co., Ltd. of Maetan-Dong, Yeongtong-Gu Suwon-Si, Gyeonggi-Do, Republic of Korea), a tablet device (e.g., an IPAD® tablet device from Apple Inc., a SAMSUNG GALAXY TAB tablet device from Samsung Electronics Co., Ltd.), a wearable computing device (e.g., a wireless web-watch device or a personal headset device), or a personal computing system (e.g., a laptop computer or non-laptop computer configuration).

In some implementations, the client computing system 22 include a diagnostic thermal imager. As an example, the diagnostic thermal imager can include and/or be arranged like the diagnostic thermal imager, part number EETH300 or the diagnostic thermal imager elite, part number EETH310, both sold by Snap-on Incorporated. In other implementations, the client computing system 22 includes a diagnostic tool that can generate a service report, such as a vehicle service report. As an example, the diagnostic tool can be operatively connected to an onboard diagnostic connector of a vehicle to allow for communication of vehicle data messages to the diagnostic tool from the vehicle. A vehicle data message or some portion of a vehicle data message can be included within a vehicle service report.

Figure 3:
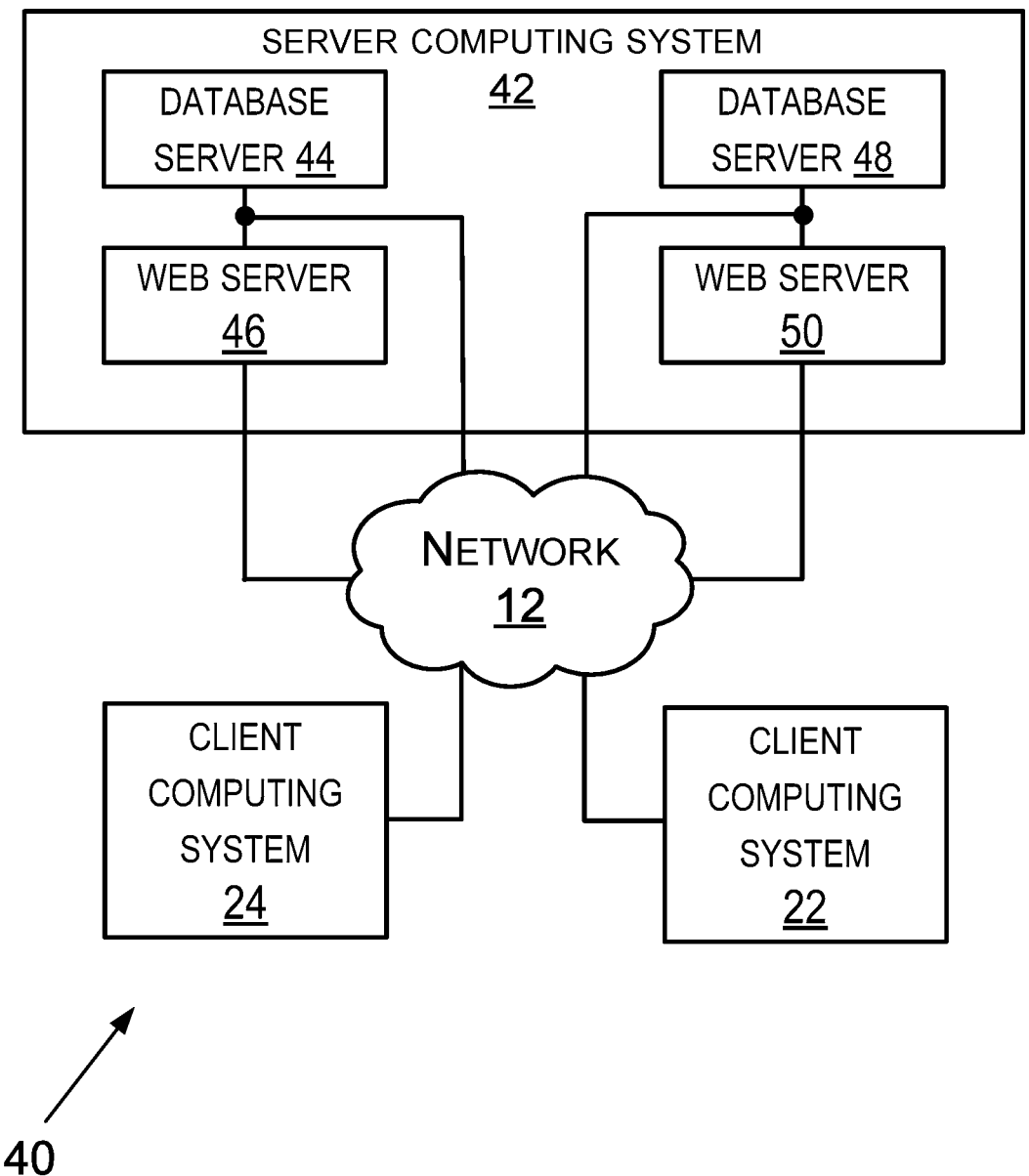

Next, FIG. 3 shows a block diagram of a system 40 in accordance with example implementations. The system 40 includes the network 12, the client computing system 22, 24, and a server computing system 42. The server computing system 42 can be configured to perform functions described as being performed by the server computing system 14, 60 (shown in FIG. 4).

The server computing system 42 includes a database server 44, a web server 46, a database server 48, and a web server 50. In an example implementation, the server computing system 42 is arranged as a distributed server computing system in which each of the database server 44, 48 and the web server 46, 50 are operatively connected to the network 12. In another example implementation, the server computing system 42 is arranged as a distributed server computing system in which the web server 46, 50 are operatively connected to the network 12 and the database server 44 and the web server 46 are operatively connected to each other, and the database server 48 and the web server 50 are operatively connected to each other. Other example arrangements of the database server 44, 48 and the web server 46, 50 are also possible.

In an example implementation, the client computing system 22 transmits a content file and metadata regarding the content file to the database server 48 over the network 12. The database server 48 can store the content file and the metadata received from the client computing system 22 in a database, such as the database 82 shown in FIG. 4. In accordance with this implementation, the client computing system 24 can display a web browser configured to request a content file stored in the database 82, transmit a request for the content file to the database server 48 or the web server 50. In response to that request, the database server 48 or the web server 50 can transmit the content file to the database server 44. The web server 46 can receive the content file from the database server 44 and then provide the content file to the client computing system 24 for display on the web page. In addition to the content file, the web server 46 can receive metadata stored at the database server 48 along with the content file or via a separate communication.

III. Example System Components

Figure 4:
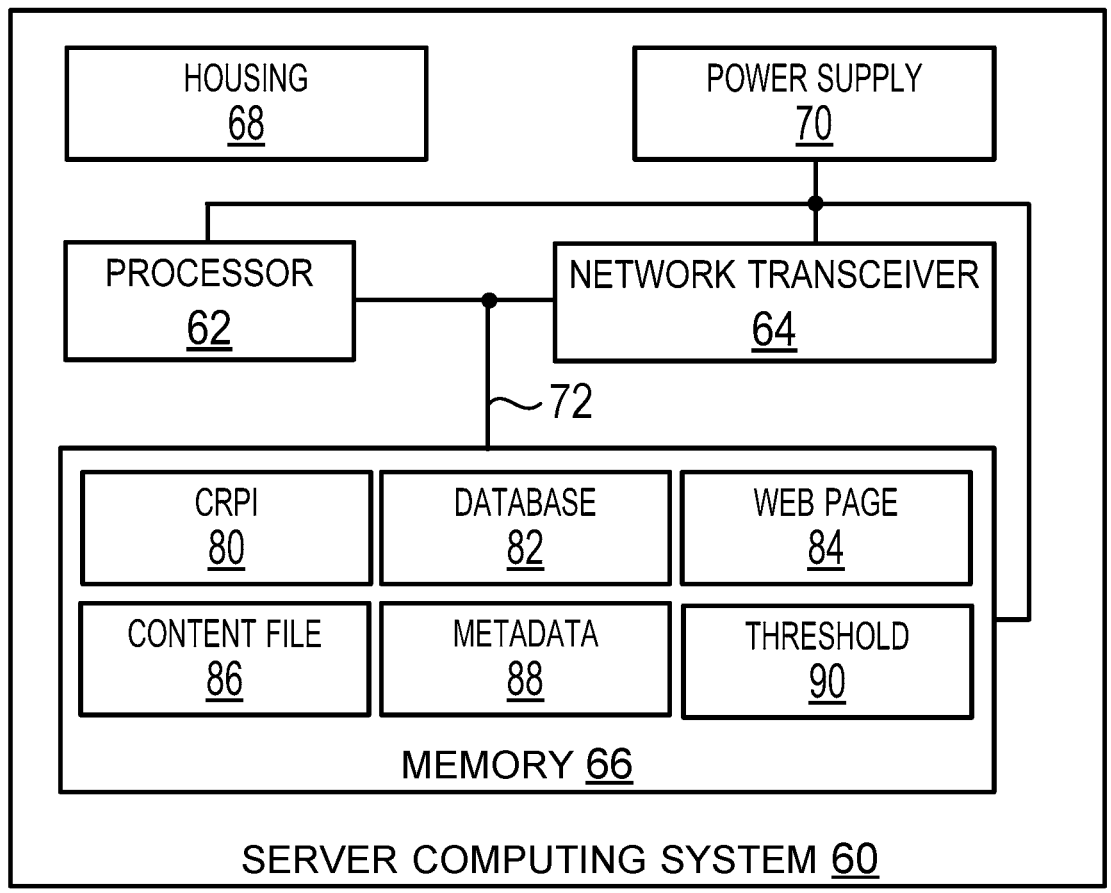
FIG. 4 is a block diagram of an example server computing system in accordance with the example implementations.

Next, FIG. 4 is a block diagram of a server computing system 60 in accordance with the example implementations. The server computing system 14 shown in FIG. 1 and FIG. 2, the database server 44, 48, shown in FIG. 3, and/or the web server 46, 50 shown in FIG. 3 can be arranged like the server computing system 60.

The server computing system 60 includes a processor 62, a network transceiver 64, a memory 66, a housing 68, and a power supply 70. Moreover, the server computing system 60 can include a data bus 72 to operatively couple the processor 62, the network transceiver 64, and/or the memory 66 to each other.

Figure 5:
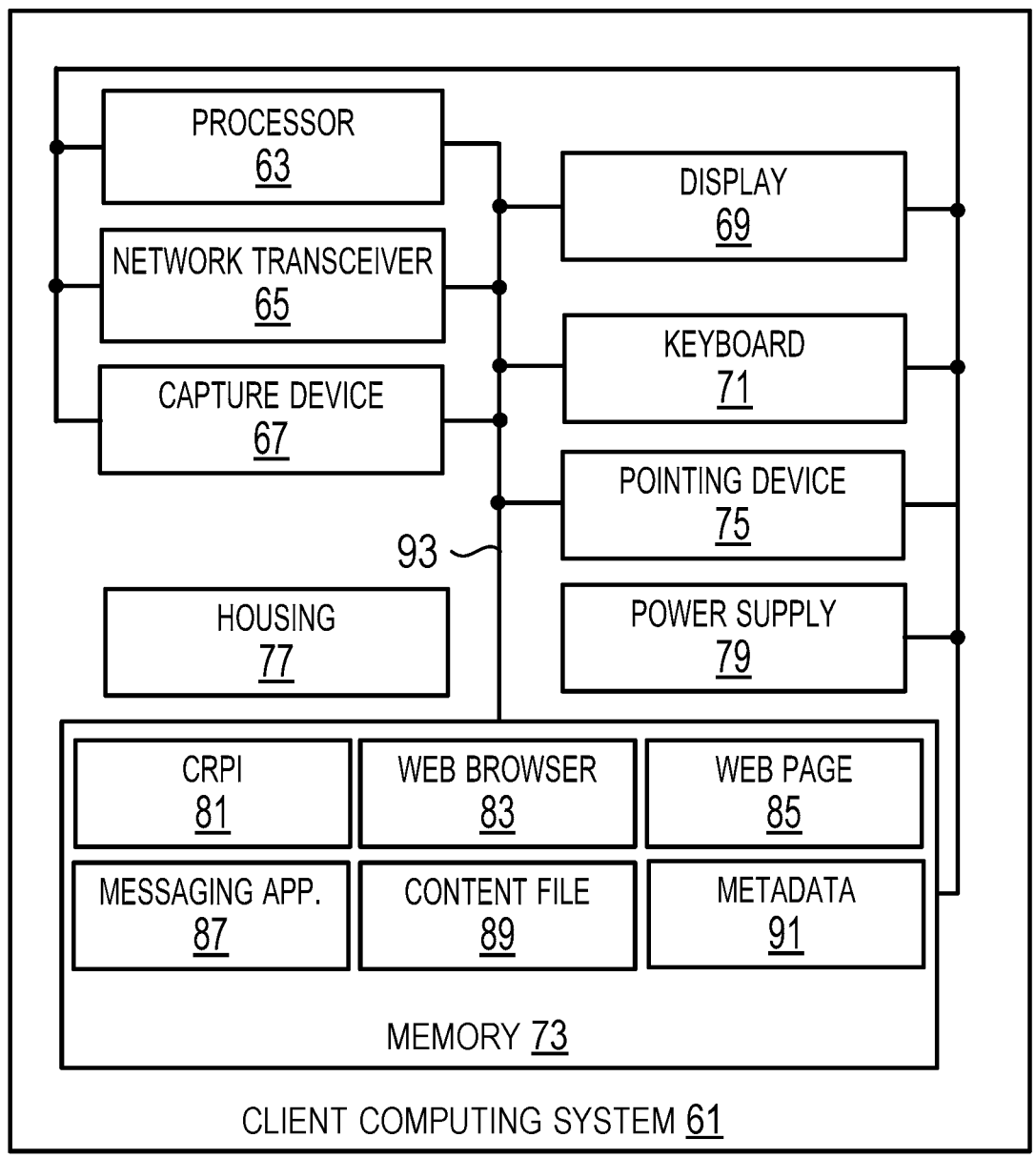
FIG. 5 is a block diagram of an example client computing system in accordance with the example implementations.

Next, FIG. 5 is a block diagram of a client computing system 61 in accordance with the example implementations. The client computing system 16, the client computing system 22, and/or the client computing system 24 (shown in FIG. 1, FIG. 2 and/or FIG. 3) can be arranged like the client computing system 61.

The client computing system 61 includes a processor 63, a network transceiver 65, a capture device 67, a display 69, a keyboard 71, a memory 73, a pointing device 75, a housing 77, and a power supply 79. Moreover, the client computing system 61 can include a data bus 93 to operatively couple the processor 63, the network transceiver 65, the capture device 67, the display 69, the keyboard 71, and/or the memory 73 to each other.

1. Processor

A processor, such as the processor 62, 63 or any other processor discussed in this description, can include one or more processors. Any processor discussed in this description can thus be referred to as "at least one processor" or "one or more processors." Furthermore, any processor discussed in this description can include a general purpose processor (e.g., an INTEL® single core microprocessor or an INTEL® multicore microprocessor), and/or a special purpose processor (e.g., a digital signal processor, a graphics processor, an embedded processor, or an application specific integrated circuit (ASIC) processor). Furthermore still, any processor discussed in this description can include or be operatively connected to a memory controller that controls a flow of data going to and from a memory, such as the memory 66. 73. In at least some implementations of the server computing system 60, the INTEL® multicore microprocessor can include one or more INTEL® XEON® processors having between four and twenty-eight cores.

Any processor discussed in this description can be configured to execute computer-readable program instructions (CRPI). Any CRPI discussed in this description can, for example, include assembler instructions, machine instructions, machine dependent instructions, microcode, firmware instructions, state-setting data, and/or either source code or object code written in one or any combination of two or more programming languages. As an example, a programming language can include an object oriented programming language such as Java, Python, or C++, or a procedural programming language, such as the "C" programming language. Any processor discussed in this description can be configured to execute hard-coded functionality in addition to or as an alternative to software-coded functionality (e.g., via CRPI). In at least some implementations of the server computing system 60, the processor 62 can be programmed to perform any function(s) described in this description as being performed by the server computing system 14, 42, 60, the database server 44, 48, and/or the web server 46, 50.

An embedded processor refers to a processor with a dedicated function or functions within a larger electronic, mechanical, pneumatic, and/or hydraulic device, and is contrasted with a general purpose computer. The embedded processor can include a central processing unit chip used in a system that is not a general-purpose workstation, laptop, or desktop computer. In some implementations, the embedded processor can execute an operating system, such as a real-time operating system (RTOS). As an example, the RTOS can include the SMX® RTOS developed by Micro Digital, Inc., such that the embedded processor can, but need not necessarily, include (a) an advanced RISC (reduced instruction set computer) machine (ARM) processor (e.g., an AT91SAM4E ARM processor provided by the Atmel Corporation, San Jose, Calif.), or (b) a COLDFIRE® processor (e.g., a 52259 processor) provided by NXP Semiconductors N.V., Eindhoven, Netherlands. A general purpose processor, a special purpose processor, and/or an embedded processor can perform analog signal processing and/or digital signal processing.

2. Memory

A memory, such as the memory 66, 73 or any other memory discussed in this description, can include one or more memories. Any memory discussed in this description can thus be referred to as "at least one memory" or "one or more memories." A memory can include a non-transitory memory, a transitory memory, or both a non-transitory memory and a transitory memory. A non-transitory memory, or a portion thereof, can be located within or as part of a processor (e.g., within a single integrated circuit chip). A non-transitory memory, or a portion thereof, can be separate and distinct from a processor.

A non-transitory memory can include a volatile or non-volatile storage component, such as an optical, magnetic, organic or other memory or disc storage component. Additionally or alternatively, a non-transitory memory can include or be configured as a random-access memory (RAM), a read-only memory (ROM), a programmable read-only memory (PROM), an erasable programmable read-only memory (EPROM), a flash memory, an electrically erasable programmable read-only memory (EEPROM), or a compact disk read-only memory (CD-ROM). The RAM can include static RAM or dynamic RAM. A non-transitory memory can be configured as a removable storage device, a non-removable storage device, or a combination thereof. A removable storage and/or a non-removable storage device can, but need not necessarily, include a magnetic disk device such as a flexible disk drive or a hard-disk drive (HDD), an optical disk drive such as a compact disc (CD) drive and/or a digital versatile disk (DVD) drive, a solid state drive (SSD), or a tape drive.

A transitory memory can include, for example, CRPI provided over a communication network, such as the network 12.

A "memory" can be referred to by other terms such as a "computer-readable memory," a "computer-readable medium," a "computer-readable storage medium," a "data storage device," a "memory device," "computer-readable media," a "computer-readable database," "at least one computer-readable medium," or "one or more computer-readable mediums." Any of those alternative terms can be preceded by the prefix "transitory" if the memory is transitory or "non-transitory" if the memory is non-transitory. For a memory including multiple memories, two or more of the multiple memories can be the same type of memory or different types of memories.

3. Transceiver

A transceiver, such as the network transceiver 64, 65 or any other transceiver discussed in this description, can include one or more transceivers. Each transceiver includes one or more transmitters configured to transmit data onto a network, such as the network 12, a data bus, and/or some other type of connection mechanism. Each transceiver includes one or more receivers configured to receive data or a communication carried over a network, such as the network 12, a data bus, and/or some other type of connection mechanism. Unless stated differently, any data described as being transmitted to a device or system is considered to be received by that device or system. Similarly, unless stated differently, any data described as being received from a device or system is considered to be transmitted by that device or system directly or indirectly to the receiving device or system. For some implementations, a transceiver can include a transmitter and a receiver in a single semiconductor chip. In at least some of those implementations, the semiconductor chip can include a processor.

In at least some of the example implementations, a transmitter, such as a transmitter within any transceiver described in this description, transmits radio signals carrying data, and a receiver, such as a receiver within any transceiver described in this description, receives radio signals carrying data. A transceiver with a radio transmitter and radio receiver can include one or more antennas and can be referred to as a "radio transceiver," an "RF transceiver," or a "wireless transceiver." "RF" represents "radio frequency."

A radio signal transmitted or received by a radio transceiver can be arranged in accordance with one or more wireless communication standards or protocols such as an IEEE® standard, such as (i) an IEEE® 802.11 standard for wireless local area networks (wireless LAN) (which is sometimes referred to as a WI-FI® standard) (e.g., 802.11a, 802.11b, 802.11g, or 802.11n), (ii) an IEEE® 802.15 standard (e.g., 802.15.1, 802.15.3, 802.15.4 (ZIGBEE®), or 802.15.5) for wireless personal area networks (PANs), (iii) a BLUETOOTH® version 4.1 or 4.2 standard developed by the Bluetooth Special Interest Group (SIG) of Kirkland, Wash., (iv) a cellular wireless communication standard such as a long term evolution (LTE) standard, (v) a code division multiple access (CDMA) standard, (vi) an integrated digital enhanced network (IDEN) standard, (vii) a global system for mobile communications (GSM) standard, (viii) a general packet radio service (GPRS) standard, (ix) a universal mobile telecommunications system (UMTS) standard, (x) an enhanced data rates for GSM evolution (EDGE) standard, (xi) a multichannel multipoint distribution service (MMDS) standard, (xii) an International Telecommunication Union (ITU) standard, such as the ITU-T G.9959 standard referred to as the Z-Wave standard, (xiii) a 6LoWPAN standard, (xiv) a Thread networking protocol, (xv) an International Organization for Standardization (ISO/International Electrotechnical Commission (IEC) standard such as the ISO/IEC 18000-3 standard for Near Field Communication (NFC), (xvi) the Sigfox communication standard, (xvii) the Neul communication standard, or (xviii) the LoRaWAN communication standard. Other examples of the wireless communication standards or protocols are possible.

In at least some of the implementations, a transmitter, such as a transmitter within any transceiver described in this description, can be configured to transmit a signal (e.g., one or more signals or one or more electrical waves) carrying or representing data onto an electrical circuit (e.g., one or more electrical circuits). Similarly, a receiver, such as a receiver within any transceiver described in this description, can be configured to receive via an electrical circuit a signal carrying or representing data over the electrical circuit. The electrical circuit can be part of a network, such as the network 12, or a data bus, such as the data bus 72, 93. The signal carried over an electrical circuit can be arranged in accordance with a wired communication standard such as a Transmission Control Protocol/Internet Protocol (TCP/IP), an IEEE® 802.3 Ethernet communication standard for a LAN, a data over cable service interface specification (DOCSIS standard), such as DOCSIS 3.1, a universal serial bus (USB) specification, or some other wired communication standard. In accordance with at least some implementations, an electrical circuit can include a wire, a printed circuit on a circuit board, and/or a network cable (e.g., a single wire, a twisted pair of wires, a fiber optic cable, a coaxial cable, a wiring harness, a power line, a printed circuit, a CAT5 cable, and/or CAT6 cable). The wire can be referred to as a "conductor". As an example, transmission of data over the conductor can occur electrically and/or optically.

A transceiver that is configured to carry out communications over the network 12, such as the network transceiver 64, 65, can include at least one of: a modem, a network interface card, a local area network (LAN) on motherboard (LOM), or a chip mountable on a circuit board. As an example the chip can include a CC3100 Wi-Fi® network processor available from Texas Instruments, Dallas, Tex., a CC256MODx Bluetooth® Host Controller Interface (HCl) module available from Texas instruments, or a different chip for communicating via Wi-Fi®, Bluetooth® or another communication protocol.

A network device within and/or coupled to the network 12 and/or that communicates via the network 12 using a packet-switched technology can be locally configured for a next 'hop' in the network 12 (e.g., a device or address where to send data to, and where to expect data from). As an example, a device (e.g., a transceiver) configured for communicating using an IEEE® 802.11 standard can be configured with a network name, a network security type, and a password. Some devices auto-negotiate this information through a discovery mechanism (e.g., a cellular phone technology).

The network transceiver 64, 65 can be arranged to transmit a request and/or receive a response using a transfer protocol, such hypertext transfer protocol (i.e., HTTP), an HTTP over a secure socket link (SSL) or transport layer security (TLS) (i.e., HTTPS), a file transfer protocol (i.e., FTP), or a simple mail transfer protocol (SMTP). The SMTP can be used to transmit an e-mail message generated by a messaging application 87. The network transceiver 65 can be arranged to transmit an SMS message using a short message peer-to-peer protocol or using some other protocol.

The data transmitted by a network transceiver can include a destination identifier or address of a computing system to which the data is to be transmitted. The data or communication transmitted by a transceiver can include a source identifier or address of the computing system including the network transceiver. The source identifier or address can be used to send a response to the computing system that includes the network transceiver that transmitted the data. This described data can include a content file and/or metadata associated with the content file.

4. Memory Content—Server Computing System

The memory 66 stores computer-readable data. As an example, the memory 66 contains computer-readable programming instructions (CRPI) 80, a database 82, a web page 84, a content file 86, metadata 88, and a threshold 90.

The CRPI 80 includes program instructions executable by the processor 62. As an example, the CRPI 80 can include program instructions that are executable to cause the server computing system 60 to perform any function described as being performed by the server computing system 14, 42, 60. As another example, the CRPI 80 can include program instructions that are executable to cause the server computing system 60 to perform any function described with respect to the set of functions 900 shown in FIG. 18 and FIG. 19 as being performed by a server computing system and/or any function described with respect to the set of functions 950 shown in FIG. 20 and FIG. 21 as being performed by a server computing system. As yet another example, the CRPI 80 can include program instructions to cause a server within the server computing system 42 to transmit a message to another server within the server computing system 42 and/or to cause a sever within the server computing system 42 to receive a message from another server within the server computing system 42. As an example, a message transmitted or received by a server within the server computing system 42 can be arranged according to HTTP, HTTPS, or FTP. As still yet another example, the CRPI 80 can include program instructions arranged as an operating system. As an example, the operating system can include a WINDOWS SERVER® 2012 R2 operating system, a WINDOWS SERVER® 2016 operating system, a VMWARE® ESXi 6.0 U3 operating system, a RED HAT® Enterprise Linux 6.9 and 7.3 operating system.

As still yet another example, the CRPI 80 can include instructions to convert a content file from a first file format to a second file format. As an example, the client computing system 22 can provide the server 48, 50 with a content file having an XML file extension and execute the CRPI 80 to convert the content file having the XML file extension to a content file having a PDF file extension. The database server 48 and/or the web server 50 can execute those CRPI 80 in response to receiving, from the database server 44 and/or the web server 46, a request for the content file having the XML file extension and/or a request for the content file having the PDF file extension.

The database 82 can include one or more databases. As an example, the database 82 can include the content file 86 and the metadata 88. As another example, the database 82 can include the content file 86, a tag array associated with the content file, and other metadata associated with the content file. As yet another example, the database 82 can include data indicating whether the content file has been shared with another individual, data indicating whether the content file was classified as a shop file such that the content file cannot be deleted using the web page 84, and/or data indicating whether the content file was classified as being a favorite. As still yet another example, the database 82 can include data indicating a user (e.g., a person or repair shop) associated with the content file 86.

In accordance with at least some example implementations, the database includes a first database that stores content files provided by the client computing system 22 that generated the content file, and a second database that stores a content file requested from the first database. The database server 44 can request and retrieve a content file from the second database and afterwards provides the content file retrieved from the second database to the web server 46 for transmission to the client computing system 24.

The web page 84 can include one or more web pages. In accordance with example implementations, the web page 84 can include a search bar, such as the search bar 106 shown in FIG. 6. Moreover, the web page 84 can expand a search bar to include an expanded portion, such as the expanded portion 188 shown in FIG. 8. The web page 84 can show a cursor in a search bar, such as the cursor 170 shown in FIG. 7. The web page 84 can show the cursor in the search bar in response to selection of the search bar. In accordance with the example implementations, the web page 84 can include a card associated with one or more content files. In accordance with at least some example implementations, the web page 84 can include any element shown in the web page 100 shown in FIG. 6 to FIG. 8 and FIG. 11, the modified web page 101 shown in FIG. 9, FIG. 10, and FIG. 12, the web page 300 shown in FIG. 13 to FIG. 15, and or the web page 350 shown in FIG. 16.

The content file 86 can include one or more content files. In at least some example implementations, the content file 86 includes a content file provided to the server computing system 60 from the client computing system 16, 22, 61.

In some implementations, the content file 86 includes an image file. The image file can, but need not necessarily, represent a visible light image captured by a visible light camera, a thermal image captured by a thermal camera, and/or a blended image generated by combining the visible light image and the thermal image. In accordance with at least some example implementations, the client computing system 16, 22, 61 can capture the visible light image and the thermal image at the same time and then adjust one or more of the visible light image and the thermal image to compensate for parallax that arises from the visible light camera and the thermal light camera being located at two different positions at the client computing system 16, 22, 61.

In some implementations, the content files representing the visible light image, the thermal image, and the blended image can be named such that a processor can determine (1) the content files are associated with one another based on, for example, a time the images were captured or a time the images used to generate the blended image were captured, and (2) the type of image represented by the content file. As an example, the file names for files representing a visible light image, a thermal image, and a blended image captured at 9:05 AM on May 31, 2019 can be named 905_31MAY2019 vjpg, 905_31MAY2019 tjpg, and 905_31MAY2019 xjpg, respectively. In each of those file names, "905" represents the capture time, "31MAY2019" represents the capture date, "v" represents visible light image, "t" represents thermal image, "x" represents blended image, and "jpg" is a file type extension indicating the image files are arranged according to the joint photographic experts group file format. Other examples of file names to distinguish files as being associated with one another or being a visible light, thermal or blended image are also possible.

In some implementations, the content file 86 can include a text file generated by the client computing system 24. A text file can include a text file having a PDF or XML file extension or some other file extension. The text file can be arranged as a service report regarding an object that was serviced, such as a vehicle service report regarding a vehicle that was service.

In some implementations, the content file 86 can include a video file. As an example, the video file can, but need not necessarily, include a video file in one of the following video file formats: (1) audio video interleave (AVI), (2) advanced systems format (ASF), (3) quick time (QT), (4) advanced video coding, high definition (AVCHD), (5) flash video (FLV), (6) moving pictures expert group (MPEG, such as MP4), or (7) Windows Media Video (WMV).

The metadata 88 can include file metadata and custom metadata. The file metadata can include metadata an application typically generates when generating a file, such as a file creation date, a file creation time, a display resolution, and/or a file size. The custom metadata can include metadata a user selects to associate with a content file. As an example, the custom metadata can include a component identifier of a component on or within some object such as a vehicle or a building, or an identifier of the object that includes the component. In accordance with at least some example implementations, the custom metadata can include metadata indicating a vehicle year, a vehicle make, and a vehicle model or some other set of identifiers that distinguish one type of vehicle from other types of vehicles or that distinguishes one vehicle from all other vehicles. The custom metadata can be associated with a content file by entry and/or selection of one or more tags at a client computing system. The one or more tags can define a tag array associated with the content file. Furthermore, the metadata 88 can include data indicating whether or not a content file has been classified as a shop file that is not to be deleted by use of a client computing system.

Turning to FIG. 17, metadata 897 associated with one or more content files is shown. The metadata 897 is arranged according to XML. In particular, the metadata 897 includes custom metadata 898. The custom metadata 898 includes tags 899 that, in combination, form a tag array. The server computing system 60 can transmit the tag array within the custom metadata 899 as XML text using an HTTP or HTTPS communication. The metadata 88 can include the metadata 897.

Returning to FIG. 4, the threshold 90 can include one or more thresholds. In some implementations, the threshold 90 can include a threshold number of content files. For example, the threshold number of content files can be twenty content files, thirty content files, forty content files, fifty content files, or a number within the range of one and fifty content files. Other examples of the threshold number of content files are also possible. In some implementations, the threshold 90 can include a threshold number of a maximum number of tag arrays to populate in an expanded portion of a search bar. As an example, the threshold number of a maximum number of tag arrays to populate in the expanded portion of the search bar can be one, two, three, four, five, six, seven, eight, nine, or ten tag arrays. Other examples of the threshold number of a maximum number of tag arrays to populate in in the expanded portion of the search bar are also possible. Moreover, in some implementations, the threshold 90 can include a threshold number of most-resent searches based on typed characters. As an example, the threshold number of most-resent searches based on typed characters can be one, two, three, four, five, six, seven, eight, nine, or ten most-recent searches. Other examples of the threshold number of most-resent searches based on typed characters are also possible.

5. Memory Content—Client Computing System

The memory 73 stores computer-readable data. As an example, the memory 73 contains CRPI 81, a web browser 83, a web page 85, a messaging application 87, a content file 89, and metadata 91.

The CRPI 81 includes program instructions executable by the processor 63. As an example, the CRPI 81 can include program instructions that are executable to cause the client computing system 61 to perform any function described as being performed by the client computing system 16, 22, 24, 61. As another example, the CRPI 81 can include program instructions that are executable to cause the client computing system 61 to perform any function described with respect to the set of functions 900 shown in FIG. 18 and FIG. 19 as being performed by a client computing system and/or any function described with respect to the set of functions 950 shown in FIG. 20 and FIG. 21 as being performed by a client computing system. As yet another example, the CRPI 81 can include program instructions to cause the client computing system 16, 22, 24, 61 to transmit a message to the server computing system 14, 42, 60 and/or to cause the client computing system 16, 22, 24, 61 to receive a message from the server computing system 14, 42, 60. As an example, a message transmitted or received by the client computing system 16, 22, 24, 61 can, but need not necessarily, be arranged according to the HTTP, the HTTPS, or the FTP. As still yet another example, the CRPI 81 can include program instructions arranged as an operating system, such as a WINDOWS® operating system, the SMX® RTOS, or some other operating system.

The web browser 83 is an application executable by the processor 63. The web browser 83 web is arranged for retrieving information from the World Wide Web using the network 12. The web browser 83 can display the web page 85 on the display 69. In at least some implementations, the web browser 83 can include a script for populating a card with one or more content files associated with the card. In at least some implementations, the web browser 83 displays the web page 85 showing a card the client computing system 61 receives with one or more content files already populated in the card.

The web page 85 can include a web page received from the server computing system 14, 42, 60. The web page 85 can include one or more web pages. In accordance with example implementations, the web page 85 can include a search bar, such as the search bar 106 shown in FIG. 6. Moreover, the web page 85 can expand a search bar to include an expanded portion, such as the expanded portion 188 shown in FIG. 8. The web page 85 can show a cursor in a search bar, such as the cursor 170 shown in FIG. 7. The web page 85 can show the cursor in the search bar in response to selection of the search bar. In accordance with the example implementations, the web page 85 can include a card associated with one or more content files. In accordance with at least some example implementations, the web page 84 can include any element shown in the web page 100 shown in FIG. 6 to FIG. 8 and FIG. 11, the modified web page 101 shown in FIG. 9, FIG. 10, and FIG. 12, the web page 300 shown in FIG. 13 to FIG. 15, and or the web page 350 shown in FIG. 16.

The messaging application 87 can include an application configured to generate a message the network transceiver 65 can transmit to a particular destination, such as an e-mail address or a mobile telephone number. As an example, the messaging application 87 can include a messaging application configured to transmit an e-mail message, a short messaging system (SMS) message, or a multi-media message system (MMS) message. The messaging application can be associated with a selector shown on a card on the web page 85, such as the selector 154 shown in FIG. 6. The messaging application 87 can receive a link to a card shown on the web page 85 and/or to a content file associated with the card, and populate a message including that link to the card without a user having to copy or type the link with the messaging application 87 executing.

The content file 89 can include a content file the server computing system 14, 42, 60 sends to the client computing system 61. In other words, the content file 89 can include the content file 86. Therefore, examples of the content file 86 described above are also examples of the content file 89. The content file 89 can include each content file associated with a card displayed on the web page 85. Moreover, the content file 89 can include each content file associated with each card displayed on the web page 85. In accordance with an example implementation in which the threshold 90 includes a threshold number of content files equal to thirty content files, the content file 89 can include one to thirty content files for displaying on the web page 85.

The metadata 91 can include file metadata and custom metadata. The metadata 91 can include metadata the server computing system 14, 42, 60 sends to the client computing system 61. The metadata 91 can be associated with a content file the server computing system 14, 42, 60 sends to the client computing system 61. Examples of the file metadata and the custom metadata described above with respect to the metadata 88 are also examples of the file metadata and custom metadata of the metadata 91.

6. Additional Components

In accordance with at least some example implementations, the capture device 67 includes a camera (e.g., one or more cameras). As an example, the capture device 67 can include a visual light camera and/or a thermal camera. In accordance with these example implementations, the visible light camera can include a visible sensor array to capture visible light radiation and output a visible light image, and the thermal camera can include a thermal sensor array to capture infrared radiation and output a thermal image. The thermal sensor array can output radiometry to provide a thermal image with measurements. Each camera can include one or more lenses. An image output by a camera can be stored as an image file and/or a content file.

In accordance with at least some example implementations, the visible light camera can include a sensor array to detect intensities and wavelengths (e.g., 380 nanometers (nm) to 750 nm) of visible light radiation that is visible to a human eye. The visible sensor array of the visible light camera can include a charge-coupled device (CCD) image sensor array, a complementary metal oxide semi-conductor (CMOS) imager sensor array, and/or one or more other optical elements that is/are known in the art. Moreover, the thermal camera can include a sensor array to detect intensities and wavelengths of infrared radiation (e.g., 750 nm to 1 millimeter (mm)). As an example, the thermal camera can include a bolometer sensor array (e.g., an uncooled microbolometer) or a thermopile infrared sensor array.

In accordance with at least some example implementations, the capture device 67 can include an image scanner, a barcode scanner, and/or a light source (e.g., a flash light for a camera).

The power supply 70, 79 can be configured in any of a variety of configurations or combinations of the variety of configurations. As an example, the power supply 70, 79 can include circuitry to receive AC current from an AC electrical supply (e.g., electrical circuits operatively connected to an electrical wall outlet) and convert the AC current to a DC current for supplying to one or more of the components therein. As another example, the power supply 70, 79 can include a battery or be battery operated. As yet another example, the power supply 70, 79 can include a solar cell or be solar operated. The power supply 70, 79 can include electrical circuits to distribute electrical current throughout the computing system including that power supply. Other examples of the power supply 70, 79 are also possible.

The housing 68, 77 can be configured in any of a variety of configurations. For example, the housing 68 can surround at least a portion of the following: the processor 62, the network transceiver 64, the memory 66, the power supply 70, and/or the data bus 72. Similarly, the housing 77 can surround at least a portion of the following: the processor 63, the network transceiver 65, the capture device 67, the display 69, the keyboard 71, the memory 73, the pointing device 75, the power supply 79, and/or the data bus 93. The housing 68, 77 can be referred to as an enclosure. The housing 68, 77 can support a substrate. In at least some example implementations, at least a portion of the following: the processor 62, the network transceiver 64, the memory 66, the power supply 70, and/or the data bus 72 can be mounted on and/or connect to a substrate of the housing 68. Similarly, in at least some other example implementations, at least a portion of the following: the processor 63, the network transceiver 65, the capture device 67, the display 69, the keyboard 71, the memory 73, the pointing device 75, the power supply 79, and/or the data bus 93 can be mounted on and/or connect to a substrate of the housing 68. The housing 68, 77 can be made from various materials. For example, the housing 68, 77 can be made from a plastic material (e.g., acrylonitrile butadiene styrene (ABS)) and a thermoplastic elastomer used to form a grip on the housing 68, 77. In at least some implementations, the housing 68 can include a rack and/or cabinet having one or more shelves.

The display 69 can include one or more displays. As an example, each display of the one or more displays can include a capacitive touch screen display, a resistive touch screen display, a plasma display, a light emitting diode (LED) display, a cathode ray tube display, an organic light-emitting diode (OLED) display, or a liquid crystal display (LCD). An OLED display can include an active-matrix OLED or a passive-matrix OLED. The LCD can include a backlit, color LCD. The display 69 can include a touch screen display with the LCD. For instance, the display 69 can include a capacitive or resistive touch screen display. Other examples of the display 69 are also possible.

The display 69 can display s still image, such as a visible light image, a thermal image, and/or a blended image. The display 69 can also display a video. The display 69 can display a text file, such as a text file with a PDF file extension or an XML file extension. The display 69 can display a hypertext markup language file. The display 69 can display a web page, such as a web page including a search bar, a cursor, and/or one or more cards showing a content file and/or tags associated with the content file. In at least some implementations, the display 69 can display a graphical user interface (GUI) via which a user can select a messaging application and a contact for generating a message populated with a link to a card including one or more content files. In at least some implementations, the display 69 can show a horizontal scroll bar and a vertical scroll bar. The horizontal scroll bar and the vertical scroll bar can be used to cause the display 69 to display content not currently displayed on the display 69. The display 69 can display a web page including any content shown in or described with respect to any one or more of FIG. 6 to FIG. 16. Other examples of content displayable on the display 69 are also possible.

The keyboard 71 can include one or more components configured for entering text characters into the client computing system 61. As an example, the text characters entered using the keyboard 71 can form a tag, a tag array, a search term within a search bar, at least a portion of a contact name or address into a message via the messaging application 87, or some other text characters. The keyboard 71 can, but need not necessarily, include a QWERTY keyboard.

The keyboard 71 can include one or more keys. In some implementations, each key includes a push button, such as a press-and-hold button or a press-and-release button. In some implementations, at least a portion of the keyboard 71 is implemented as part of a touch screen display that includes soft keys, such as capacitive or resistive keys of a touch screen display. In still other implementations, the soft keys of the keyboard 71 on the touch screen display can include a power on/off key, a yes key and a no key, and/or four directional cursor keys (such as left, up, right, down keys). Other examples of the keyboard 71 are also possible.

The pointing device 75 can include a user input device to input spatial data into the client computing system 61. In accordance with at least some example implementations, the pointing device 75 can include a computer mouse configured for moving a cursor, such as a cursor 108 shown in FIG. 6 and other figures, on the display 69. In accordance with those example implementations, the pointing device 75 can be configured to input various types of inputs such as a single click input, a double click input, and/or a drag and drop input. In at least some implementations, an input described as being performed using the pointing device 75 can be performed using a touch screen portion of the display 69.

IV. Example Operation

Figure 18:
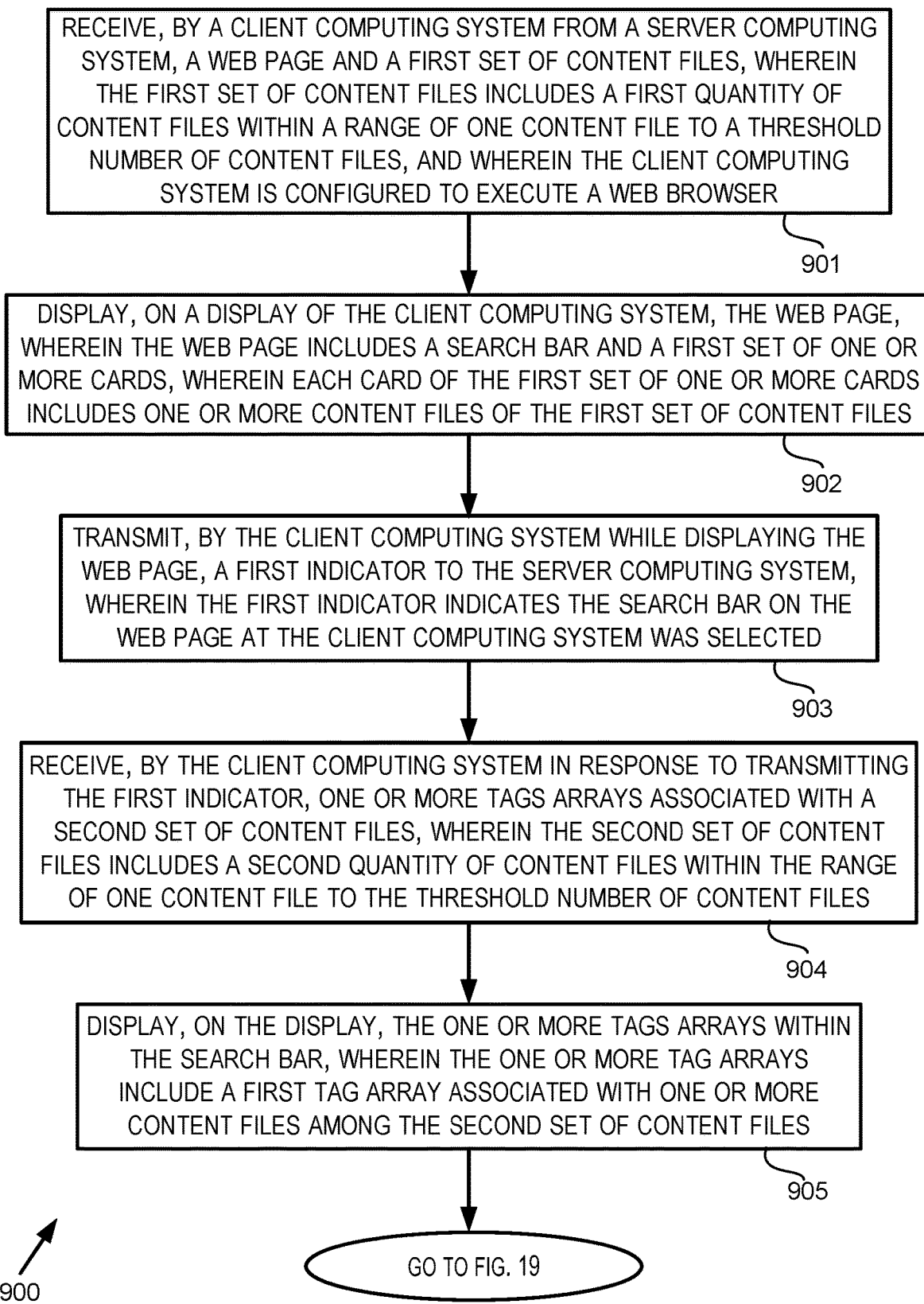
FIG. 18 and FIG. 19 depict a flow chart showing an example method in accordance with the example implementations.
Figure 19:
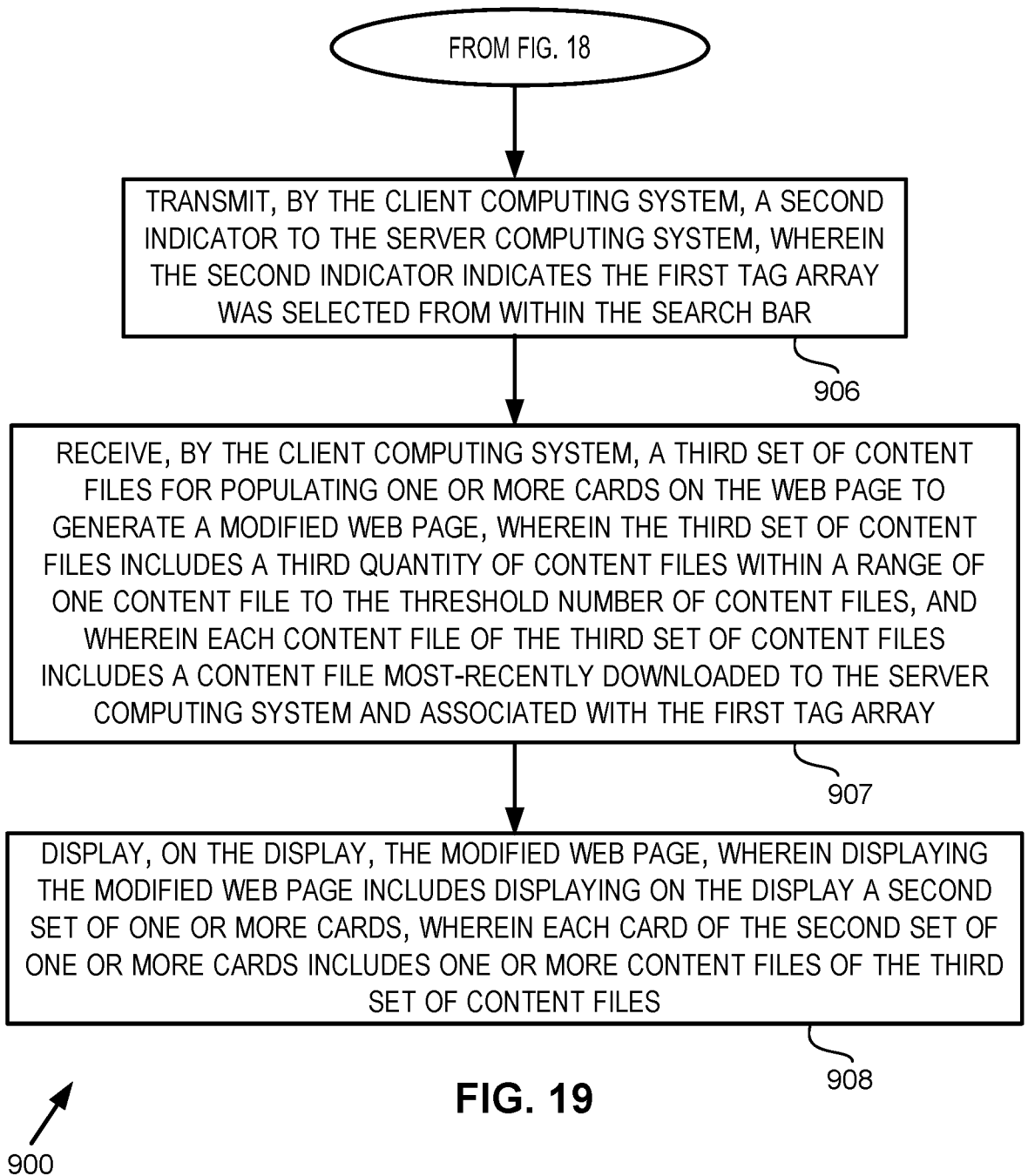

Next, FIG. 18 and FIG. 19 show a flowchart depicting a set of functions 900 of a representative method for modifying a web page. Two or more functions and/or portions of two or more functions of the set of functions 900 may, but need not necessarily, be performed at the same time.

At block 901, the method includes receiving, by a client computing system from a server computing system, a web page and a first set of content files. The first set of content files includes a first quantity of content files within a range of one content file to a threshold number of content files. The client computing system is configured to execute a web browser.

At block 902, the method includes displaying the web page on a display of the client computing system. The web page includes a search bar and a first set of one or more cards. Each card of the first set of one or more cards includes one or more content files of the first set of content files.

At block 903, the method includes transmitting, by the client computing system while displaying the web page, a first indicator to the server computing system. The first indicator indicates the search bar on the web page at the client computing system was selected.

At block 904, the method includes receiving, by the client computing system in response to transmitting the first indicator, one or more tags arrays associated with a second set of content files. The second set of content files includes a second quantity of content files within the range of one content file to the threshold number of content files.

At block 905, the method includes displaying, on the display, the one or more tags arrays within an expanded portion of the search bar. The one or more tag arrays include a first tag array associated with one or more content files among the second set of content files.

At block 906, the method includes transmitting, by the client computing system, a second indicator to the server computing system. The second indicator indicates the first tag array was selected from within the expanded portion of the search bar.

At block 907, the method includes receiving, by the client computing system, a third set of content files for populating one or more cards on the web page to generate a modified web page. The third set of content files includes a third quantity of content files within a range of one content file to the threshold number of content files. Each content file of the third set of content files includes a content file most-recently downloaded to the server computing system and associated with the first tag array.

At block 908, the method includes displaying, on the display, the modified web page. Displaying the modified web page includes displaying on the display a second set of one or more cards. Each card of the second set of one or more cards includes one or more content files of the third set of content files.

Figure 20:
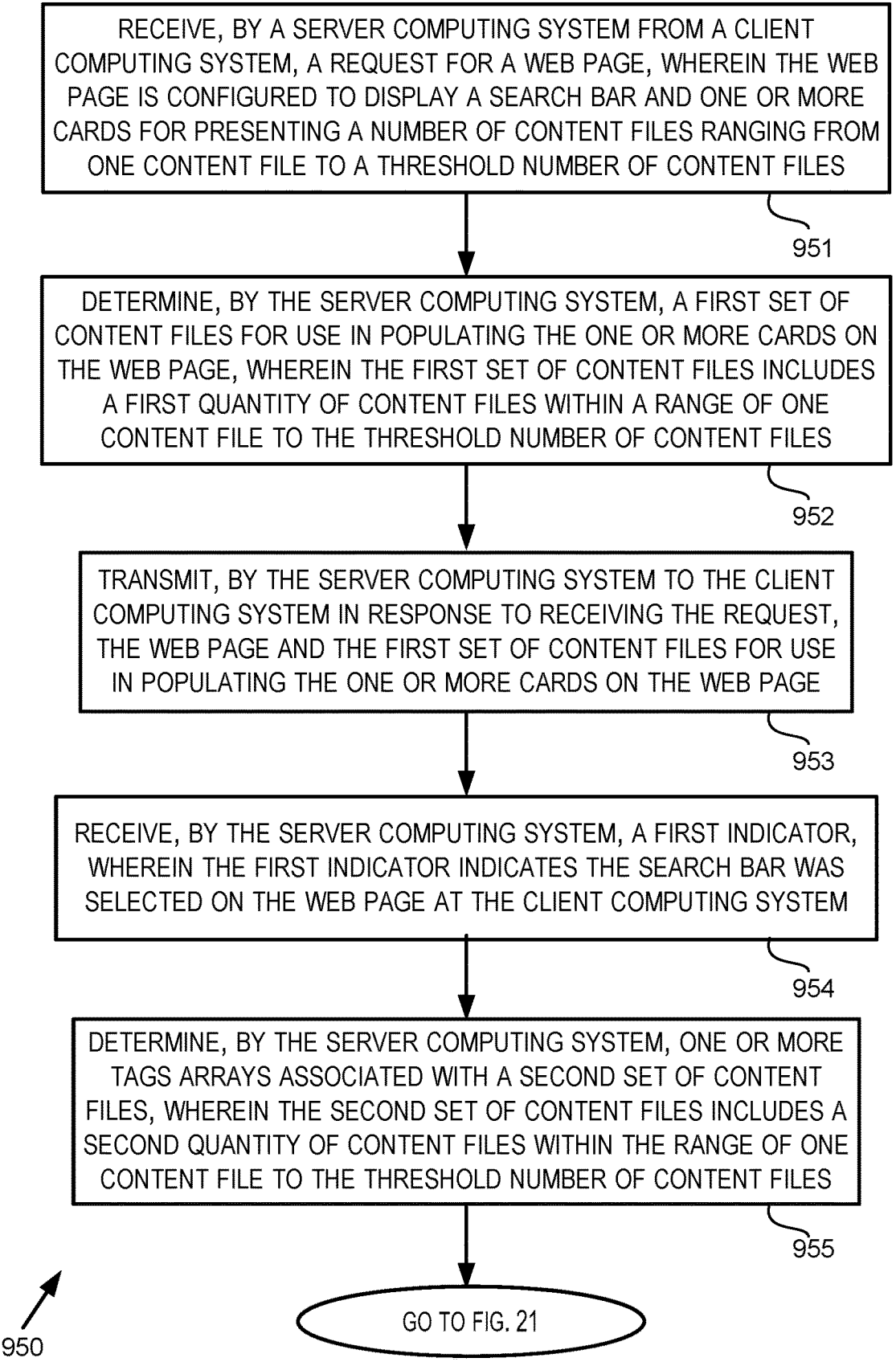

The following example implementations down to the discussion of FIG. 20 and FIG. 21 pertain to the representative method discussed with respect to the set of functions 950.

In an example implementation, the method also includes receiving, by the client computing system from the server computing system, respective metadata for each content file of the first set of content files. The respective metadata for each content file includes a timestamp associated with that content file. The respective metadata for a first content file of the first set of content files includes a tag array associated with the first content file of the first set of content files. Furthermore, displaying the web page includes displaying the one or more cards in an order based on a timestamp of at least one content file included within each of the one or more cards. Furthermore still, displaying the web page includes displaying the tag array associated with the first content file within a card including the first content file.

In an example implementation, the first set of content files and the second set of content files are identical. As an example, both the first set of content files and the second set of content files include the threshold number of files most-recently received by the server computing system 14, 42, 60. Moreover, the files most-recently received can consist of files from a client computing system associated with a single account or from client computing systems associated with different accounts. In an alternative implementation, the first set of content files and the second set of content files are not identical.

In an example implementation, the first tag array includes a vehicle year tag, a vehicle make tag, and/or a vehicle model tag. Additionally or alternatively, the first tag array can include a symptom pertaining to a vehicle and/or a component on the vehicle.

In an example implementation, each content file of the first set of content files includes a content file among a set of content files most-recently downloaded to the server computing system and wherein a quantity of content files in the set of content files most-recently downloaded to the server computing system equals the first quantity of content files. Additionally or alternatively, each content file of the second set of content files includes a content file among the set of content files most-recently downloaded to the server computing system and wherein a quantity of content files in the set of content files most-recently downloaded to the server computing system equals the second quantity of content files.

Moreover, the method of the example implementation in the preceding paragraph can further include transmitting, from the client computing system to the server computing system, a request for the web page associated with a single account. Each content file of the first set of content files is associated with the single account. Each content file of the second set of content files is associated with the single account. Each content file of the third set of content files is associated with the single account or with multiple accounts. In at least some cases of the foregoing implementation, the single account is associated with a person, a repair shop, or a client computing system, and each account of the multiple accounts is associated with a person, a repair shop, or a client computing system.

In an example implementation, the method further includes transmitting, from the client computing system to the server computing system, a request for the web page associated with a single account. Each content file of the first set of content files is associated with the single account. Each content file of the second set of content files is associated with the single account. Each content file of the third set of content files is associated with the single account or with multiple accounts. In at least some cases of this implementation, the single account is associated with a person, a repair shop, or a client computing system, and each account of the multiple accounts is associated with a person, a repair shop, or a client computing system.

In an example implementation, the method further includes transmitting, by the client computing system, a third indicator to the server computing system. The third indicator indicates one or more characters has been entered into the search bar using a keyboard of the client computing system. The method also includes receiving, by the client computing system, a type-ahead search term entered during each of a quantity of most-recent searches based on typed characters. The quantity of most-recent searches based on typed characters is less than or equal to a threshold number of most-recent searches based on typed characters. The type-ahead search term entered during each of the quantity of most-recent searches begin with the one or more characters indicated by the third indicator. Furthermore, the method includes displaying, on the display, the type-ahead search term entered during each of the quantity of most-recent searches based on typed characters for use in populating the expanded portion of the search bar at the client computing system with the type-ahead search term entered during each of the quantity of most-recent searches based on typed characters instead of or in addition to the one or more tag arrays.

In an example implementation, the method further includes displaying, on the display, a share selector on an individual card displayed on the web page or on the modified web page. The method also includes displaying, on the display after selection of the share selector, a graphical user interface configured for entering selections for sharing the individual card with an entity. The method also includes determining, by the client computing system, a selection of an entity and an application to generate a message entered using the graphical user interface. Furthermore, the method includes generating, by client computing system using the application, a message populated with a link from which a device can request at least a portion of one or more content files associated with the individual card. Furthermore still, the method includes transmitting, by the client computing system, the message to a network for transmission to the device.

In at least some cases of the example implementation discussed in the preceding paragraph, the data to populate in the graphical user interface includes a name of one or more entities and an indicator of at least one application for generating the message. Moreover, the at least one application includes at least one of the following: an e-mail message application, a short-message-service message application, or a multi-media-service message application.

In an example implementation, one or more content files among the first set of content files, the second set of content files, and/or the third set of content files includes a visible light image file, a thermal image file, a blended image file, or a file having a PDF extension or an XML extension.

In an example implementation, the method further includes expanding a size of the search bar so that an entirety of the one or more tag arrays can be displayed within the expanded portion of the search bar.

In an example implementation, the method further includes receiving, by the client computing system from the server computing system, a quantity of prior search text strings within a range of one prior search text string to a threshold number of prior search text strings. Still further, this method includes displaying, on the display, the quantity of prior search text stings within the expanded portion of the search bar while displaying the one or more tag arrays within the expanded portion of the search bar.

In an example implementation, the threshold number of content files can include a number of content files between one and fifty. More particularly, the threshold number of content files can include a number of content files between one and forty. Even more particularly, the threshold number of content files can include a number of content files between one and thirty. Still even more particularly the threshold number of content files can include a number of content files between one and twenty.

In an example implementation, the one or more tag arrays include a number of tag arrays between one and ten tag arrays. More particularly, the one or more tag arrays include a number of tag arrays between one and seven tag arrays. Even more particularly, the one or more tag arrays include a number of tag arrays between one and five tag arrays. Still even more particularly, the one or more tag arrays include a number of tag arrays between one and three tag arrays.

In an example implementation, selecting the search bar on the web page includes selecting the search bar using a pointing device. In at least some of those implementations, using the pointing device to select the search bar includes entering a single click or double click input of the pointing device while a cursor moveable by the pointing device is positioned within the search bar.

In an example implementation, transmitting the first indicator includes transmitting a message that is formatted according to an HTTP or HTTPS transfer protocol and that includes the first indicator. Likewise, in an example implementation, transmitting the second indicator includes transmitting a message that is formatted according to an HTTP or HTTPS transfer protocol and that includes the second indicator. Moreover, in an example implementation, transmitting the third indicator includes transmitting a message that is formatted according to an HTTP or HTTPS transfer protocol and that includes the third indicator.

In an example implementation, receiving the one or more tag arrays includes receiving a separate XML output for each tag array. In an alternative implementation, receiving the one or more tag arrays includes receiving a single XML output including the one or more tag arrays.

In an example implementation, receiving the third set of content files for populating one or more cards on the web page includes the client computing system receiving the one or more cards already populated with the third set of content files.

Next, FIG. 20 and FIG. 21 show a flowchart depicting a set of functions 950 of a representative method for modifying a web page. Two or more functions and/or portions of two or more functions of the set of functions 950 may, but need not necessarily, be performed at the same time.

At block 951, the method includes receiving, by a server computing system from a client computing system, a request for a web page. The web page is configured to display a search bar and one or more cards for presenting a number of content files ranging from one content file to a threshold number of content files.

At block 952, the method includes determining, by the server computing system, a first set of content files for use in populating the one or more cards on the web page. The first set of content files includes a first quantity of content files within a range of one content file to the threshold number of content files.

At block 953, the method includes transmitting, by the server computing system to the client computing system in response to receiving the request, the web page and the first set of content files for use in populating the one or more cards on the web page.

At block 954, the method includes receiving, by the server computing system, a first indicator. The first indicator indicates the search bar was selected on the web page at the client computing system.

At block 955, the method includes determining, by the server computing system, one or more tags arrays associated with a second set of content files. The second set of content files includes a second quantity of content files within the range of one content file to the threshold number of content files.

At block 956, the method includes transmitting, by the server computing system to the client computing system in response to receiving the first indicator, the one or more tag arrays for displaying within an expanded portion of the search bar. The one or more tag arrays include a first tag array associated with one or more content files among the second set of content files.

At block 957, the method includes receiving, by the server computing system, a second indicator from the client computing system. The second indicator indicates the first tag array was selected from within the expanded portion of the search bar.

At block 958, the method includes determining, by the server computing system, a third set of content files for populating one or more cards on the web page to generate a modified web page. The third set of content files includes a third quantity of content files within a range of one content file to the threshold number of content files. Each content file of the third set of content files includes a content file most-recently downloaded to the server computing system and associated with the first tag array.

At block 959, the method includes transmitting, by the server computing system to the client computing system in response to receiving the second indicator, the third set of content files for populating the one or more cards on the web page to generate the modified web page at the client computing system.

The following example implementations down to the section that discusses example web pages pertain to the representative method discussed with respect to the set of functions 950.

In an example implementation, the first set of content files and the second set of content files are identical.

In an example implementation, each content file of the first set of content files includes a content file among a set of content files most-recently downloaded to the server computing system. Moreover, a quantity of content files in the set of content files most-recently downloaded to the server computing system equals the first quantity of content files. Additionally or alternatively, each content file of the second set of content files includes a content file among the set of content files most-recently downloaded to the server computing system and a quantity of content files in the set of content files most-recently downloaded to the server computing system equals the second quantity of content files.

In an example implementation, the method further includes receiving, by the server computing system before receiving the request for the web page, one or more content files and, for each content file of the one or more content files, metadata associated with that content file, wherein the metadata associated with each of at least some of the one or more content files includes a tag array.

In an example implementation, the request for the web page is associated with a single account. In accordance with this example implementation, determining the first set of content files includes determining each content file of the first set of content files is associated with the single account. Moreover, determining the one or more tag arrays associated with the second set of content files includes determining each content file of the second set of content files is associated with the single account, and determining the third set of content files includes determining each content file of the third set of content files is associated with the single account.

In an example implementation, the method further includes receiving, by the server computing system, a third indicator from the client computing system. The third indicator indicates one or more characters has been entered into the search bar using a keyboard at the client computing system. Furthermore, this method includes determining, by the server computing system, a type-ahead search term entered during each of a quantity of most-recent searches based on typed characters. The quantity of most-recent searches based on typed characters is less than or equal to a threshold number of most-recent searches based on typed characters, and wherein the type-ahead search term entered during each of the quantity of most-recent searches begin with the one or more characters indicated by the third indicator. Furthermore still, the method includes transmitting, by the server computing system to the client computing system in response to receiving the third indicator, the type-ahead search term entered during each of the quantity of most-recent searches based on typed characters for use in populating the expanded portion of the search bar at the client computing system with the type-ahead search term entered during each of the quantity of most-recent searches based on typed characters instead of or in addition to the one or more tag arrays.

In an example implementation, the method further includes receiving, by the server computing system, a fourth indicator from the client computing system. The fourth indicator indicates a share selector associated with an individual card displayed on the web page or the modified web page has been selected. The method further includes determining, by the server computing system, data to populate in a graphical user interface on the web page. The graphical user interface is configured for entering selections for sharing the individual card with an entity. The method also includes transmitting, by the server computing system to the client system in response to receiving the fourth indicator, the data to populate in the graphical user interface on the web page. Moreover, the method includes receiving, by the server computing system, a fifth indicator from the client computing system. The fifth indicator indicates a selection of an entity and an application to generate a message. Furthermore, the method includes generating, by the server computing system, a message populated with a link from which a device can request at least a portion of one or more content files associates with the individual card. Furthermore still, the method includes transmitting, by the server computing system, the message to a network for transmission to the device.

In an example implementation, the data to populate in the graphical user interface includes a name of one or more entities and an indicator of at least one application for generating the message. Moreover, the at least one application includes at least one of the following: an e-mail message application, a short-message-service message application, or a multi-media-service message application.

In an example implementation, a distinct card displayed on the web page or on the modified web page includes a shop file selector. One or more content files are associated with the distinct card. In accordance with this implementation, the method further includes receiving, by the server computing system a sixth indicator indicating the shop file selector was selected from the distinct card. The method also includes storing, by the server computing system in response to receiving the sixth indicator, a permanent link for accessing the one or more content files associated with the distinct card.

In an example implementation, determining the one or more tag arrays includes excluding a tag array identical to a tag array of the one or more tag arrays and/or excluding a tag array associated with a content file received by the server computing system after receiving each content file associated with a respective tag array of the one or more tag arrays.

In an example implementation, the server computing system includes a first web server and a second web server. Moreover, receiving the first indicator includes the first web server receiving the first indicator. In accordance with this implementation, determining the one or more tags arrays includes transmitting, by the first web server to the second web server, a file list request. Furthermore, determining the one or more tags arrays includes receiving, by the first web server from the second web server, a response to the file list request including a name of each content file of the second set of content files and respective metadata regarding each content file of the second set of content files. The respective metadata regarding each content file includes a respective time stamp and a respective tag array if that content file is associated with a tag array of the one or more tag arrays. Furthermore still, determining the one or more tags arrays includes determining, by the first web server, the one or more tag arrays do not include any duplicate tag arrays and the one or more tag arrays are associated with respective content files that are associated with a tag array and a latest time stamp.

In an example implementation, one or more content files among the first set of content files, the second set of content files, and/or the third set of content files includes a visible light image file, a thermal image file, a blended image file, or a file having a PDF extension or an XML extension.

In an example implementation, the threshold number of content files can include a number of content files between one and fifty. More particularly, the threshold number of content files can include a number of content files between one and forty. Even more particularly, the threshold number of content files can include a number of content files between one and thirty. Still even more particularly the threshold number of content files can include a number of content files between one and twenty.

In an example implementation, the one or more tag arrays include a number of tag arrays between one and ten tag arrays. More particularly, the one or more tag arrays include a number of tag arrays between one and seven tag arrays. Even more particularly, the one or more tag arrays include a number of tag arrays between one and five tag arrays. Still even more particularly, the one or more tag arrays include a number of tag arrays between one and three tag arrays.

In an example implementation, receiving the first indicator includes receiving a message that is formatted according to an HTTP or HTTPS transfer protocol and that includes the first indicator. Likewise, in an example implementation, receiving the second indicator includes receiving a message that is formatted according to an HTTP or HTTPS transfer protocol and that includes the second indicator. Moreover, in an example implementation, receiving the third indicator includes receiving a message that is formatted according to an HTTP or HTTPS transfer protocol and that includes the third indicator. Furthermore, in an example implementation, receiving the fourth indicator includes receiving a message that is formatted according to an HTTP or HTTPS transfer protocol and that includes the fourth indicator. Furthermore still, in an example implementation, receiving the fifth indicator includes receiving a message that is formatted according to an HTTP or HTTPS transfer protocol and that includes the fifth indicator. Furthermore still, in an example implementation, receiving the sixth indicator includes receiving a message that is formatted according to an HTTP or HTTPS transfer protocol and that includes the sixth indicator.

In an example implementation, the request for the web page is associated with a single account. In accordance with that implementation, each content file of the first set of content files is associated with the single account, each content file of the second set of content files is associated with the single account, and each content file of the third set of content files is associated with the single account or with multiple accounts.

In an example implementation, populating the one or more cards on the web page includes the server computing system populating the one or more cards with the third set of content files. In accordance with this example implementation, transmitting the third set of content files for populating the one or more cards on the web page includes the server computing system transmitting the one or more cards already populated with the third set of content files.

V. Example Web Pages

Figure 6:
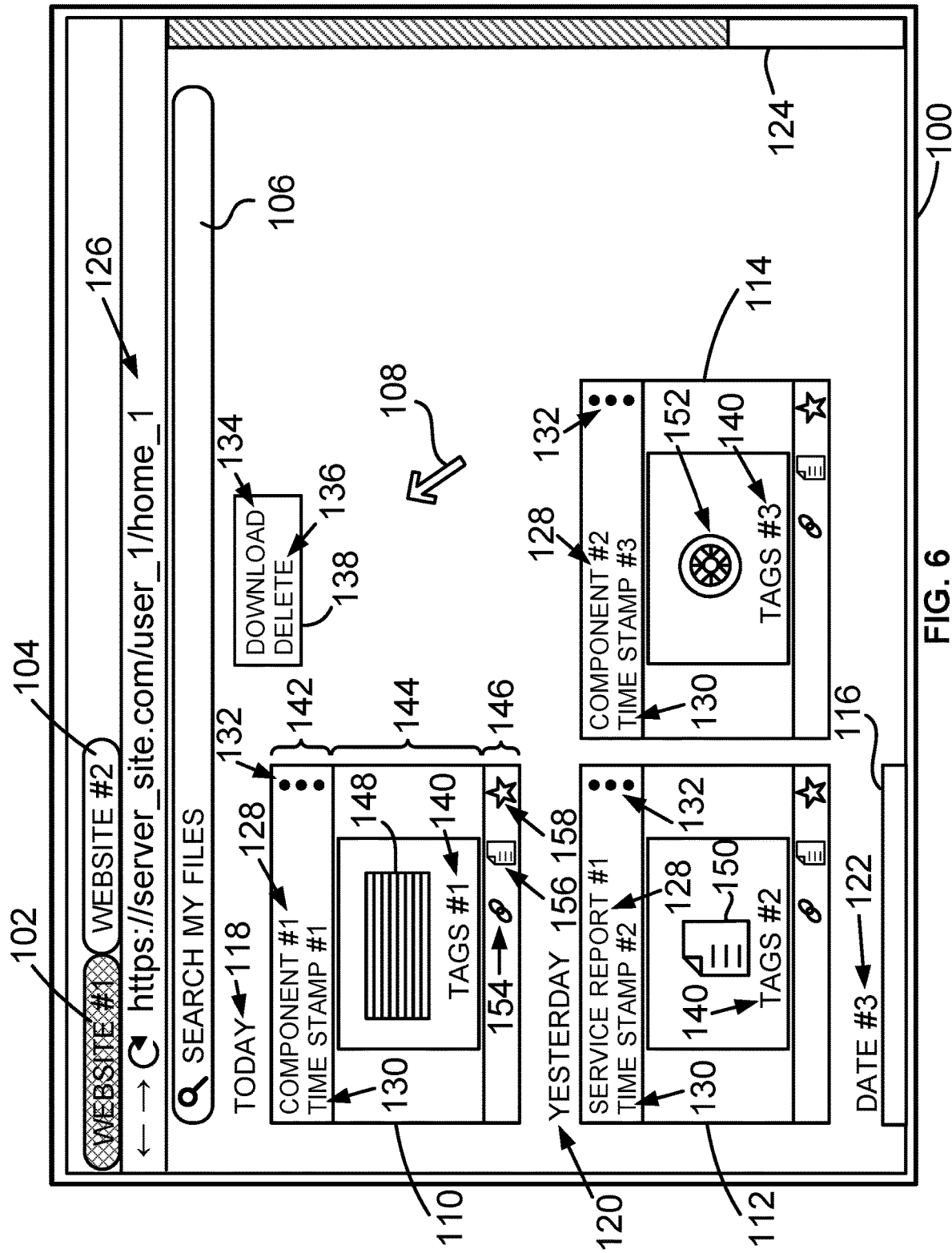
FIG. 6, FIG. 7, FIG. 8, FIG. 9, FIG. 10, FIG. 11, FIG. 12, FIG. 13, FIG. 14, FIG. 15, and FIG. 16 show example web pages in accordance with the example implementations.

FIG. 6 shows a web page 100 in accordance with the example implementations. The web page 100 can be displayed on the display 69 while the processor 63 is executing the web browser 83. The web browser 83 can, but need not necessarily, include a web page within a tab. FIG. 6 and other the figures showing web pages show a tab 102, 104. The web page 100 is displayed while the tab 104 is active. The tab 102 can be selected to cause the web browser 83 to display a different web page. The web page 100 includes a search bar 106 and a cursor 108. The web page 100 also includes a card 110, 112, 114, 116, a date indicator 118, 120, 122, a scroll bar 124, and a web link bar 126. The web link bar 126 can include a uniform resource locator indicative of a location on the World Wide Web.

The web page 100 can include an attribute and/or a script to show different portions of a card. For example, an attribute can include a size attribute indicating a length and width of a card. As another example, an attribute can include a card segment attribute, such as an attribute defining a card segment 142, 144, 146. For clarity of FIG. 6 and other figures showing a card on a web page, the reference numbers for the card segment 142, 144, 146 are shown only with respect to the card 110, but every other card shown in the figures can also include the card segment 142, 144, 146 although the content of the card segment 142, 144, 146, in combination, of the other cards differs from the content of the card segment 142, 144, 146 of the card 110. In other implementations, the attributes discussed with respect to the card segment 142, 144, 146 can be included on a card without any segments being defined for the card.

The card segment 142 includes an identifier 128. For some cards, such as the card 110, the identifier 128 can be indicative of a component, such as a component of a heating, ventilation, and air conditioning (HVAC) system. As an example, that component can include a component of a vehicle HVAC system. For other cards, such as the card 112, the identifier 128 can be indicative of a service report, such as a vehicle service report, associated with the card.

The card segment 142 includes a time stamp 130. For some cards, such as the card 110, the time stamp 130 can be indicative of when a content file associated with the card was captured. For other cards, such as the card 112, the time stamp 130 can be indicative of when a service report associated with the card was generated.

The card segment 142 includes a selector 132. The selector 132 can include a selector 134 that is selectable by the cursor 108 to cause the card 110 and/or a content file associated with the card 110 to be downloaded to the client computing system 61. The selector 132 can include a selector 136 that is selectable by the cursor 108 to cause the content file(s) associated with the card 110 to be deleted from a database. In some implementations, the selector 134, 136 can be displayed within the card segment 142. In those or in other implementations, the selector 134, 136 can be shown in a graphical user interface 138 that appears when the cursor 108 is moved onto the selector 132 and that disappears when the cursor 108 is moved off of the selector 132 and/or the graphical user interface 138. FIG. 6 shows the graphical user interface 138 offset from the card 110 so as to not block other elements of the card 110.

The card segment 144 includes a tag array 140 associated with the content file(s) associated with the card including the tag array 140. The card segment 144 for the card 110 shows an image 148 of a content file associated with the card 110. As an example, the image 148 shown on the card can include a visible light image of an air conditioning condenser, a thermal image of the air conditioning condenser, or a blended image of the air conditioning condenser. The card 110 can be associated with one or more of those three images. The air conditioning condenser can be a component within an HVAC system, such as an HVAC system for conditioning air in a vehicle or a building.

The card segment 144 of the card 112 including the tag array 140 can include an indicator 150 indicative of the card 112 being associated with a service report. The card segment 144 of the card 114 including the tag array 140 shows an image 152 of a content file associated with the card 114. As an example, the image 152 can be an image of a tire and/or wheel of a vehicle.

The card segment 146 of a card, such as the card 110, 112, 114 can include a selector 154, 156, 158. The selector 154 can be arranged as a share selector for sharing a link to the card including the selector 154. The selector 156 can be arranged as a shop file selector configured to cause the content files associated with the card including the selector 156 to be classified as a shop file that cannot be deleted using the web page 100 and/or a client computing system 16, 22, 24, 61. The selector 158 can be arranged as a favorite selector selectable to classify the content file(s) associated with card including the selector 158 as a favorite content file. The content file(s) classified as a favorite content file can be searched for and located using a web page, such as the web page 100.

A date indicator on the web page 100 can include text indicating a particular day, month and year, such as Dec. 31, 2019 and/or a date indicator can indicate a day by text such as "today," yesterday," "last Monday." Other examples of a date indicator are also possible. The date indicator 118, 120, 122 can be arranged on the web page to indicate a single date when content file(s) for one or more cards were captured and/or generated. As an example, the date indicator 118 indicates a date on which the content file(s) associated with the card 110 were generated. As another example, the date indicator 120 indicates a date on which the content file(s) associated with the cards 110, 112 were captured and/or generated. As yet another example, the date indicator 122 indicates a date on which the content file(s) associated with the card 116 were captured and/or generated.

The scroll bar 124 is shown as a vertical scroll bar to allow for moving the web page 100 up and/or down on the display 69. Additionally or alternatively, the scroll bar 124 can be arranged as and/or include a horizontal scroll bar to allow for moving the web page 100 left and/or right on the display 69.

Figure 7:
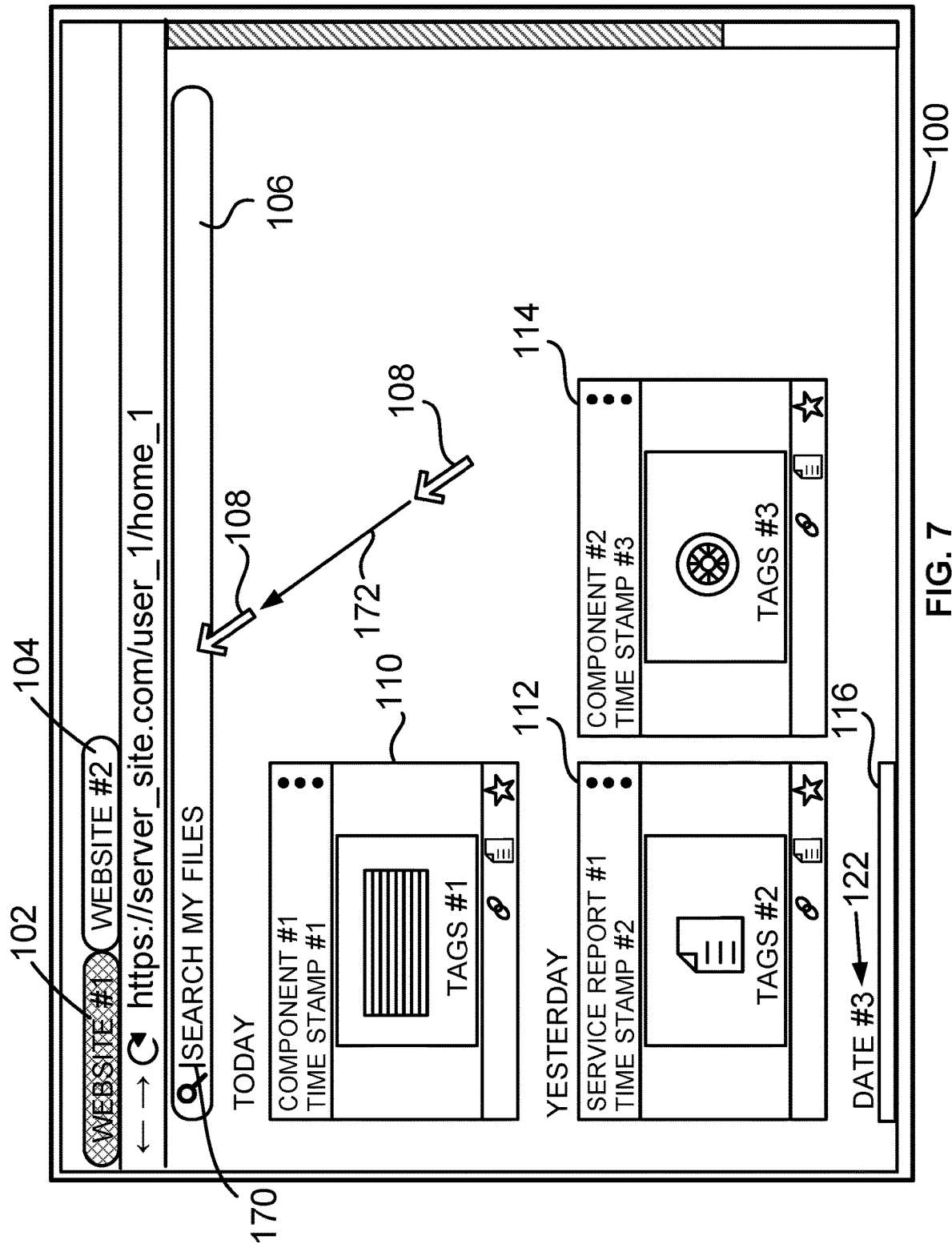

Next, FIG. 7 shows the web page 100 in accordance with the example implementations. In particular, FIG. 7 represents, via an arrow 172, the cursor 108 moving in a direction of the arrow 172 from a position in which the cursor 108 is not within the search bar 106 to a position in which at least a portion of the cursor 108 is within the search bar 106. In response to the cursor 108 being moved within the search bar 106, a cursor 170 appears within the search bar 106 to indicate where in the search bar 106 text characters will appear when entered using the keyboard 71. The cursor 170 moves rightward within the search bar 106 as each text character is entered using the keyboard 71 or leftward as any previously entered text character is deleted using the keyboard 71. The cursor 170 can repeatedly disappear and then reappear so that the cursor 170 appears to be flashing. The search bar 106 can show text, such as "SEARCH MY FILES", until a first text character is entered using the keyboard 71.

Figure 8:
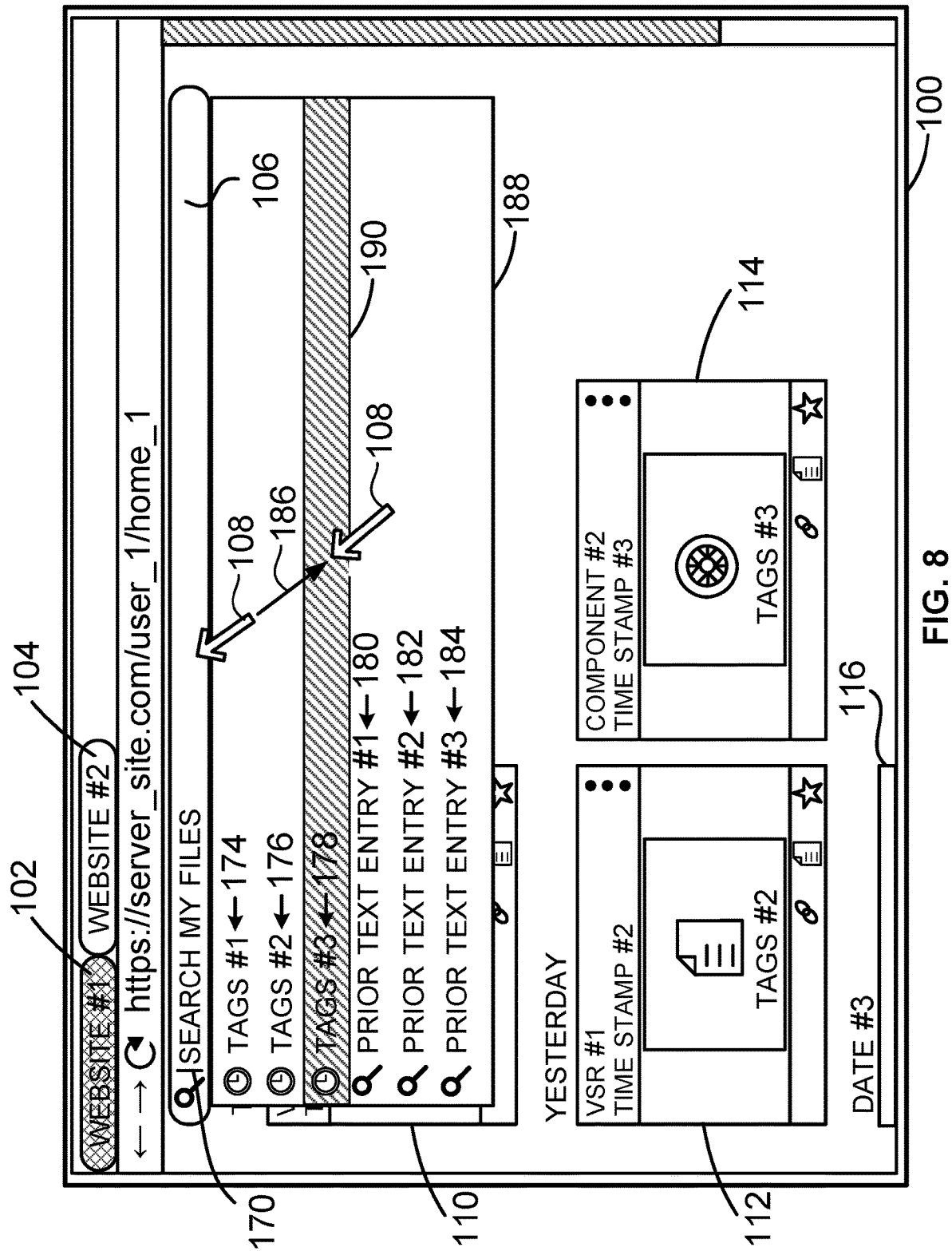

Next, FIG. 8 shows the web page 100 in accordance with the example implementations. In particular, FIG. 8 shows the web page 100 after the cursor 108 was moved into the search bar 106 and then in a direction of an arrow 186 into an expanded portion 188 of the search bar 106, before any text characters are entered into the search bar 106 using the keyboard 71 or after deleting any and all text characters entered into the search bar 106 using the keyboard 71. In FIG. 8, the expanded portion 188 of the search bar 106 is shown below the search bar 106. In other example implementations, an expanded portion of the search bar 106 could be above the search bar 106, to the left of the search bar 106, or to the right of the search bar 106. The direction of the cursor 108 moving into the expanded portion 188 of the search bar 106 can be in a direction that differs from the direction of the arrow 186.

In FIG. 8, the expanded portion 188 of the search bar 106 is shown to include tag array 174 176, 178, and prior text entry 180, 182, 184. The server computing system 60 can provide the tag array 174, 176, 178, and the prior text entry 180, 182, 184 to the client computing system 61 in response to receiving an indicator that indicate the search bar 106 has been selected from the web page 100. The client computing system 61 can send that indicator to the server computing system 60 in response to the cursor 108 being positioned within the search bar 106.

The cursor 108 can be moved within the expanded portion 188 of the search bar 106 in order to select the tag array 174 176, 178, or the prior text entry 180, 182, 184. As shown in FIG. 8, the cursor 108 is moved in the direction of the arrow 186 until the cursor 108 is in line with the tag array 178. A row highlighter 190 appears on a row within the expanded portion 188 at which the cursor 108 is pointing. The pointing device 75 can select a tag array or prior text entry within the expanded portion 188. As an example, the pointing device 75 can select the tag array 178 using a single click input when the cursor is positioned on the row highlighter 190. In some implementations, a tag array or prior text entry can be selected using the pointing device 75 or the keyboard 71 without any row highlighter being displayed within the expanded portion 188.

Figure 9:
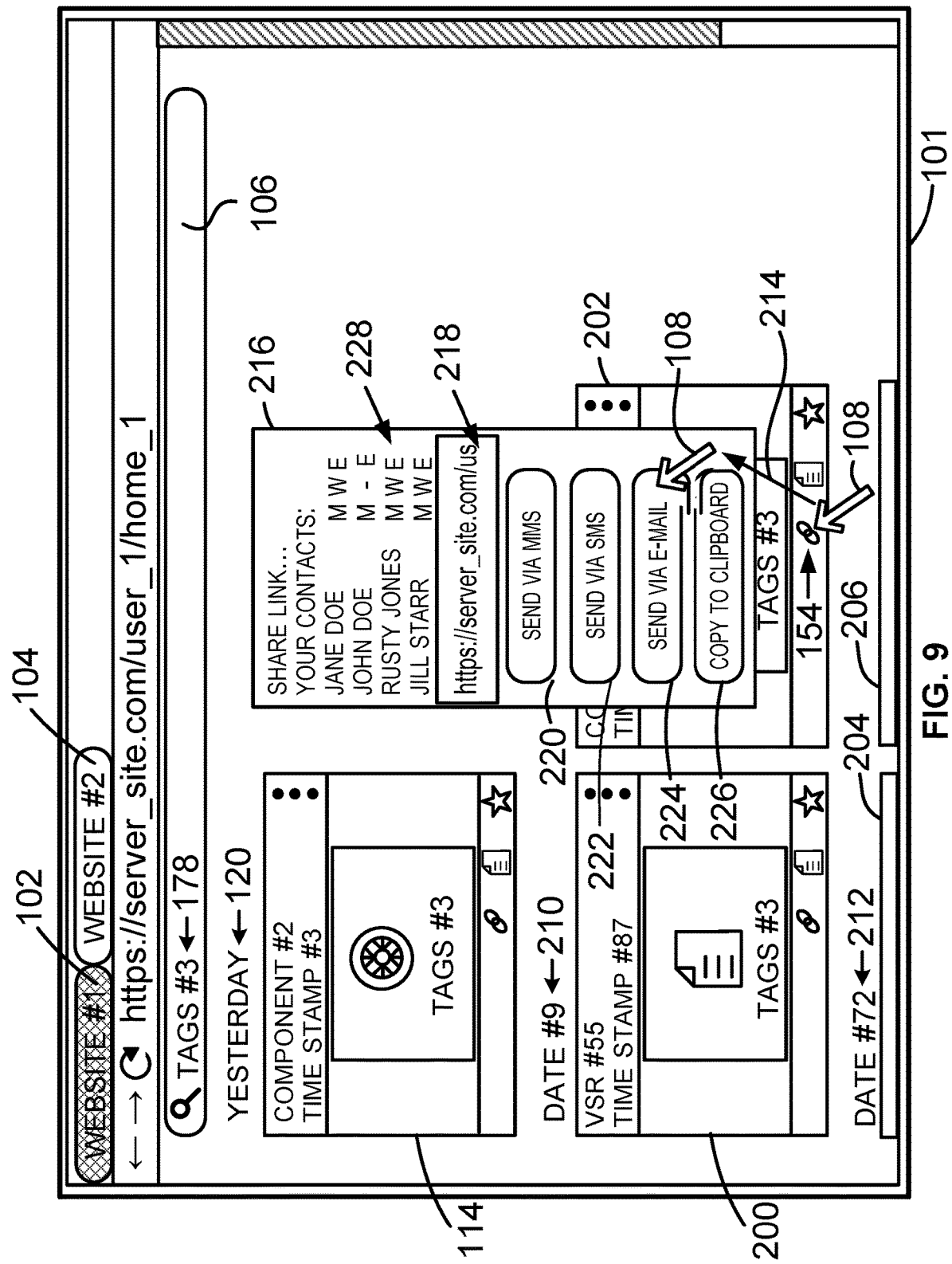

Next, FIG. 9 shows a modified web page 101 in accordance with the example implementations. In particular, FIG. 9 shows the modified web page 101 after the cursor 108 is moved in line with the tag array 178, the tag array 178 is selected, and the web page 100 shown in FIG. 8 is modified to include cards associated with the tag array 178. In other words, FIG. 9 shows the modified web page 101. As an example, the modified web page 101 shows cards 114, 200, 202, 204, 206, each of which is associated with the tag array 178, shown by way of example as "Tags #3." Moreover, the modified web page 101 shows the date indicator 120, and a date indicator 210, 212. The date indicator 210 indicates a date upon which the content file(s) associated with the card 200, 202 were captured and/or generated. Likewise, the date indicator 212 indicates a date upon which the content file(s) associated with the card 204, 206 were captured and/or generated. Selection of the tag array 178 can, for example, occur by performing a single or double click selection using the cursor 108 while the cursor 108 is positioned on the tag array 178 or a row of the expanded portion 188 including the tag array 178 (as shown in FIG. 8). After selection of the tag array 178 from the expanded portion 188, the tag array is shown in the search bar 106 (as shown in FIG. 9).

Furthermore, FIG. 9 shows the modified web page 101 after the selector 154 is selected from the card 202. In particular, FIG. 9 shows a graphical user interface 216 that appears after selection of the selector 154 from the card 202. The graphical user interface 216 includes an indicator 218 indicative of a uniform resource locator associated with the card 202 and/or the content files associated with the card 202.

The graphical user interface 216 includes an application selector 220, 222, 224 and a selector 226. The application selector 220 is selectable to cause the processor 63 to launch and/or execute the messaging application 87 to send a multi-media messaging system (MMS) message. The application selector 222 is selectable to cause the processor 63 to launch and/or execute the messaging application 87 to send a short messaging system (SMS) message. The application selector 224 is selectable to cause the processor 63 to launch and/or execute the messaging application 87 to send an e-mail message. The selector 226 is selectable to cause the processor 63 to store the uniform resource locator indicated by the indicator 218 into a clipboard. The uniform resource locator stored into the clipboard can subsequently be pasted into a message, file, document or other source being created.

The graphical user interface 216 also includes contacts 228 selectable for adding into an address of a message being generated by the messaging application. The contacts 228 can indicate whether a mobile phone number, a work phone number, and/or an e-mail address is available for each contact. FIG. 9 shows such indication by use of a letter "M" for a mobile phone number being available, a letter "W" for a work phone number being available, and a letter "E" for an e-mail address being available. A hyphen can represent one of the mobile phone number, the work phone number, and/or the e-mail address not being available for a given contact.

FIG. 9 shows an arrow 214 to represent the cursor 108 being moved from the selector 154 to the application selector 224. The pointing device 75 may be used to enter a single or double click input while the cursor 108 is positioned on the selector 154 to cause the graphical user interface 216 to be displayed. The pointing device 75 may be used to enter a single or double click input while the cursor 108 is positioned on the application selector 224 in order to cause the processor 63 to launch the messaging application 87 for generating an e-mail message automatically populated with the uniform resource locator indicated by the indicator 218.

Figure 10:
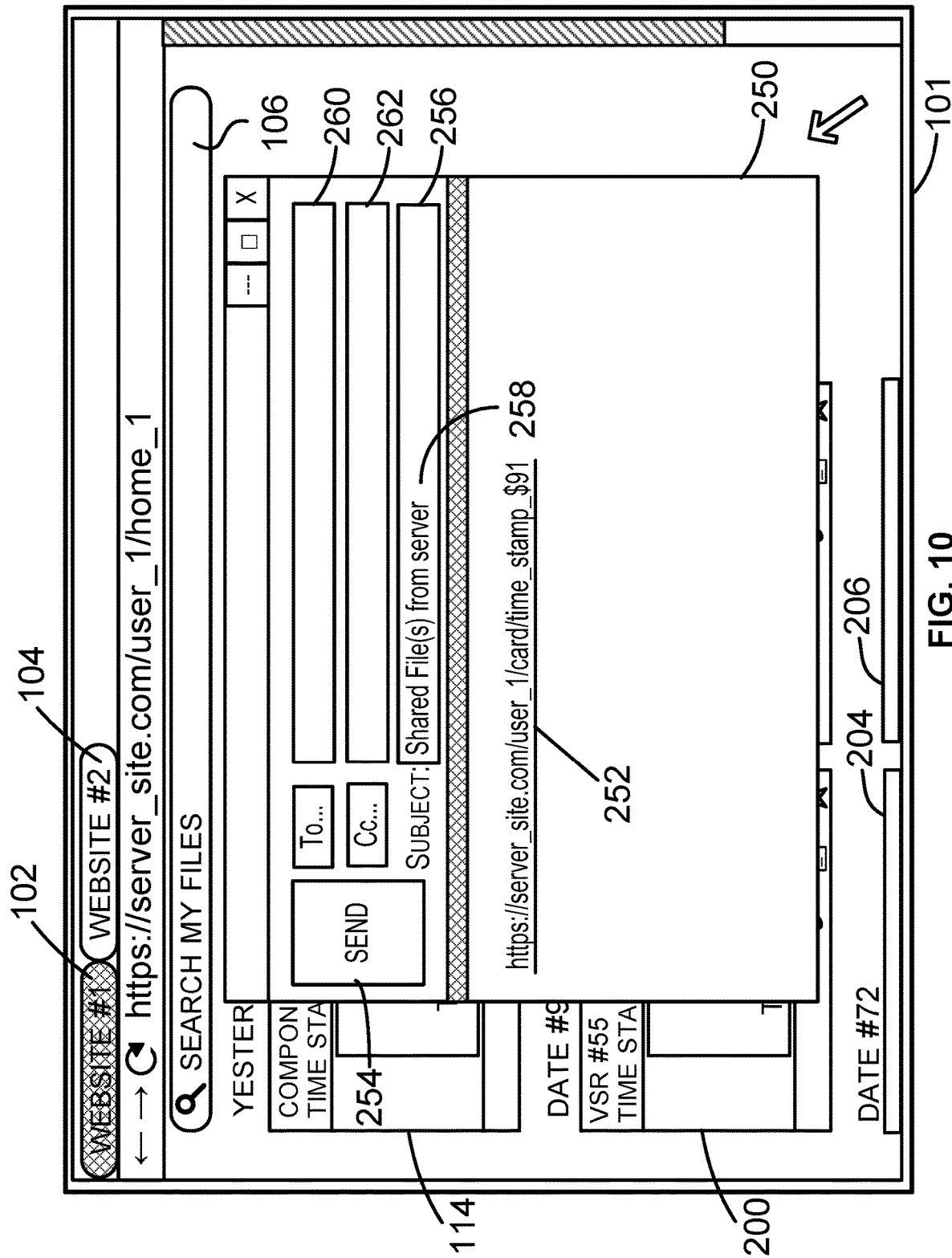

Next, FIG. 10 shows the modified web page 101 in accordance with the example implementations. In particular, FIG. 10 shows a graphical user interface 250 the processor 63 generates using the messaging application 87 in response to a selection of the application selector 224 from the graphical user interface 216 shown in FIG. 9. The messaging application 87 populates the graphical user interface 250 with a uniform resource locator 252 that matches the uniform resource locator within the indicator 218. In at least some implementations, the messaging application 87 populates a subject line 256 of the graphical user interface 250 with a subject 258 pertaining to the card that includes the selector 154 that was selected to cause the graphical user interface 216 to be displayed. A user can enter one or more e-mail addresses onto an address line 260, 262 and cause the client computing system 61 to send an e-mail message including the uniform resource locator 252 by selecting a send selector 254 using the cursor 108.

Figure 11:
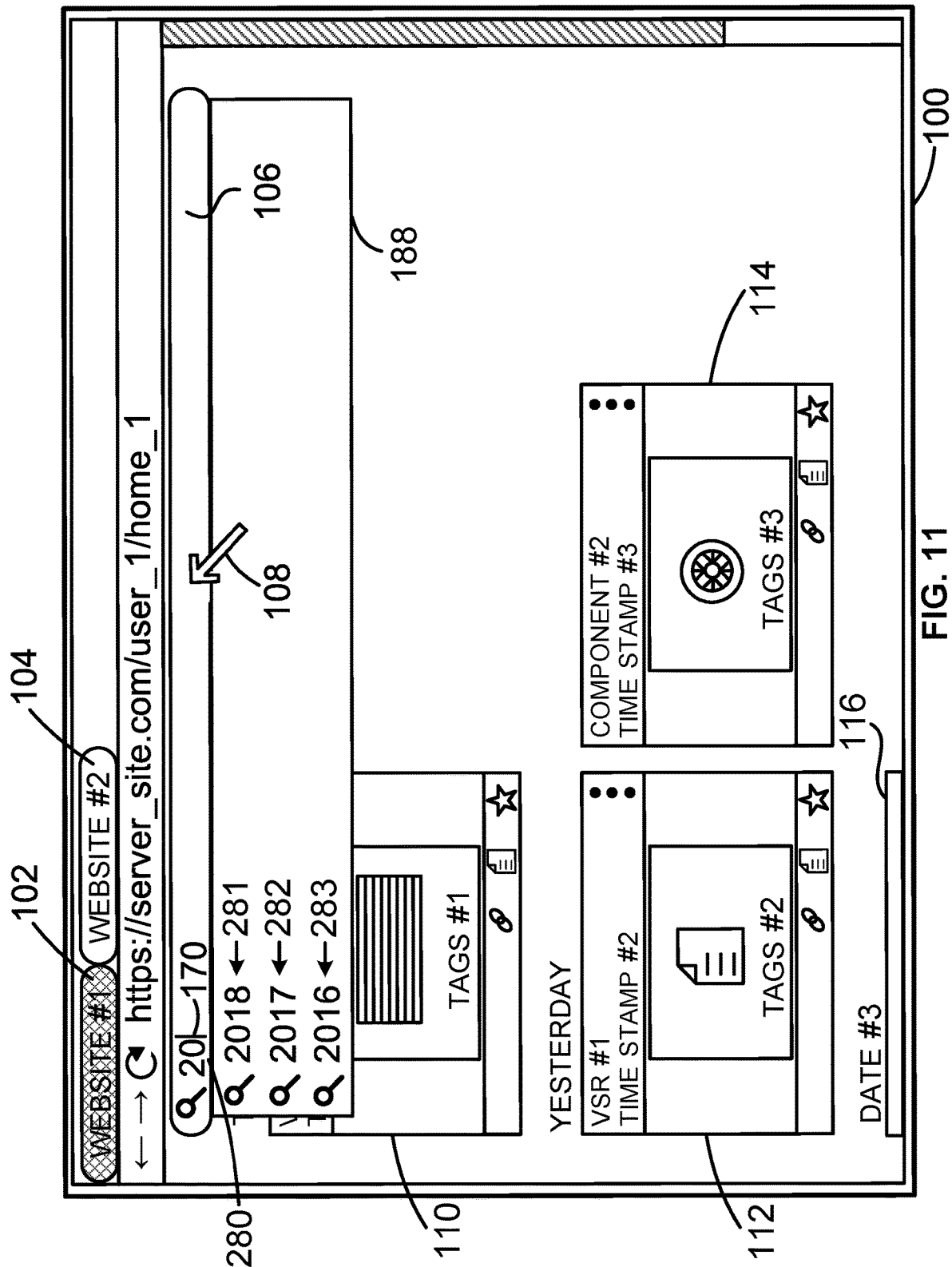

Next, FIG. 11 shows the web page 100 in accordance with the example implementations. In FIG. 11, the cursor 170 is present in the search bar 106 while the card 110, 112, 114, 116 are shown on the web page 100. The text characters 280 have been entered into the search bar 106 using the keyboard 71 while the cursor 170 is present in the search bar 106. Moreover, the web page 100 shows the expanded portion 188 of the search bar 106 including prior text entry 281, 282, 283. Each of the prior text entry 281, 282, 283 begins with and includes the text characters 280. In some example implementations, the expanded portion 188 of the search bar 106 appears after a threshold number of text characters 280 have been entered into the search bar and the text characters 280 match a prior text entry. As an example, the threshold number of text characters equals one, two, three, or four text characters.

In at least some example implementations, selection of the prior text entry 281, 282, 283 can, for example, occur by performing a single or double click selection using the cursor 108 while the cursor 108 is positioned on the prior text entry 281, 282, 283 or a row of the expanded portion 188 including the prior text entry 281, 282, 283. After selection of the prior text entry 281, 282, 283 from the expanded portion 188, the prior text entry 281, 282, 283 is shown in the search bar 106 and the expanded portion 188 showing the prior text entry 281, 282, 283 is removed. For example, the prior text entry 282 can be selected from the expanded portion 188 while the prior text entry 281, 282, 283 are displayed in the expanded portion 188 and then the expanded portion 188 is removed, but the prior text entry 282 is shown in the search bar 106. Moreover, the web page 100 can be modified to show a card that includes a content file associated with a tag array including a tag that includes the text characters 280.

Figure 12:
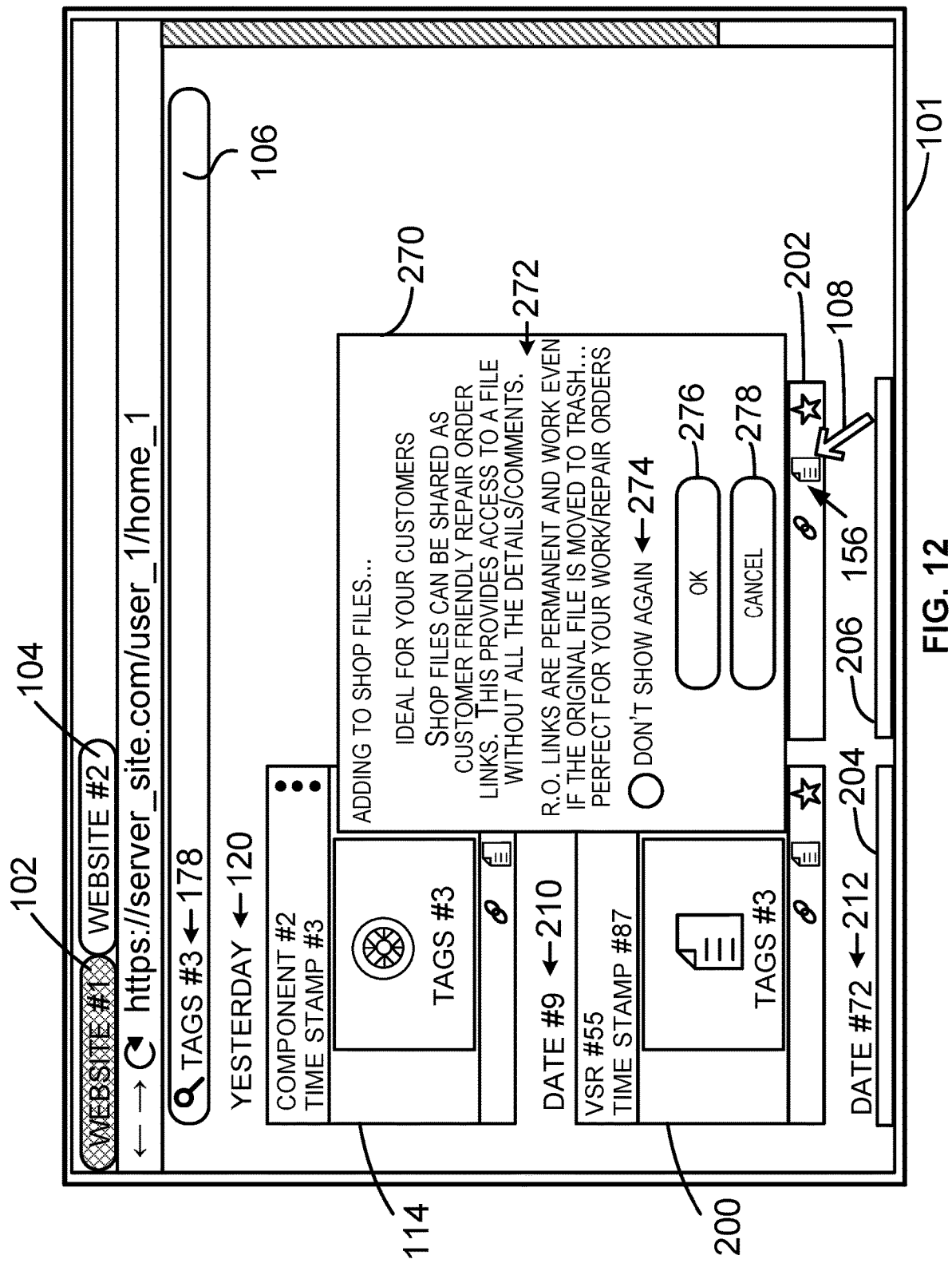

Next, FIG. 12 shows the modified web page 101 in accordance with the example implementations. In particular, FIG. 12 shows the modified web page 101 described above with respect to FIG. 9, where the modified web page 101 shows cards 114, 200, 202, 204, 206, each of which is associated with the tag array 178. Moreover, the modified web page 101 shows the date indicator 120, 210, 212 discussed above with respect to FIG. 9. The modified web page 101 shown in FIG. 12 can be displayed in response to selection of the tag array 178 while the cursor 108 is positioned on the tag array 178 or a row of the expanded portion 188 including the tag array 178 (as shown in FIG. 8). After selection of the tag array 178 from the expanded portion 188, the tag array is shown in the search bar 106 (as shown in FIG. 12).

Furthermore, FIG. 12 shows the modified web page 101 after the selector 156 is selected from the card 202. In particular, FIG. 12 shows a graphical user interface 270 that appears after selection of the selector 156 from the card 202. The graphical user interface 270 includes guidance 272 describing classifying a content file as a shop file. Classifying a content file as a shop file results in prohibiting the content file from being deleted using the modified web page 101 and/or the client computing system 16, 22, 24, 61.

The graphical user interface 270 also includes a selector 274 selectable so that the guidance 272 no longer appears in the graphical user interface 270 when the graphical user interface 270 is displayed on a web page for a user that selected the selector 274. Furthermore, the graphical user interface 270 includes a selector 276 selectable to cause the client computing system 61 to request the server computing system 60 to classify the content file associated with the card 202 as a shop file. Furthermore still, the graphical user interface 270 includes a selector 278 selectable to close the graphical user interface 270 without classifying the content file associated with the card 202 as a shop file.

Figure 13:
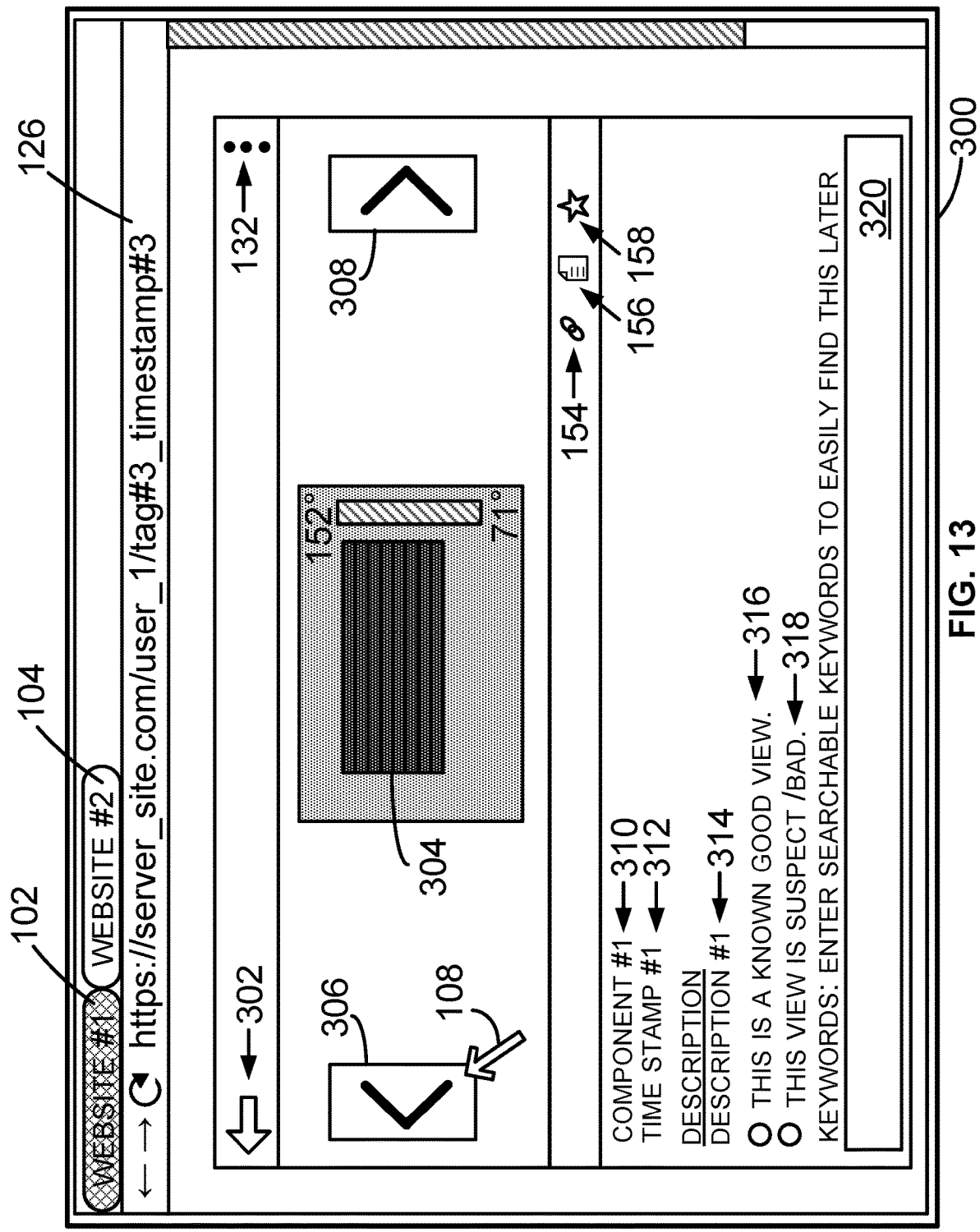
Figure 14:
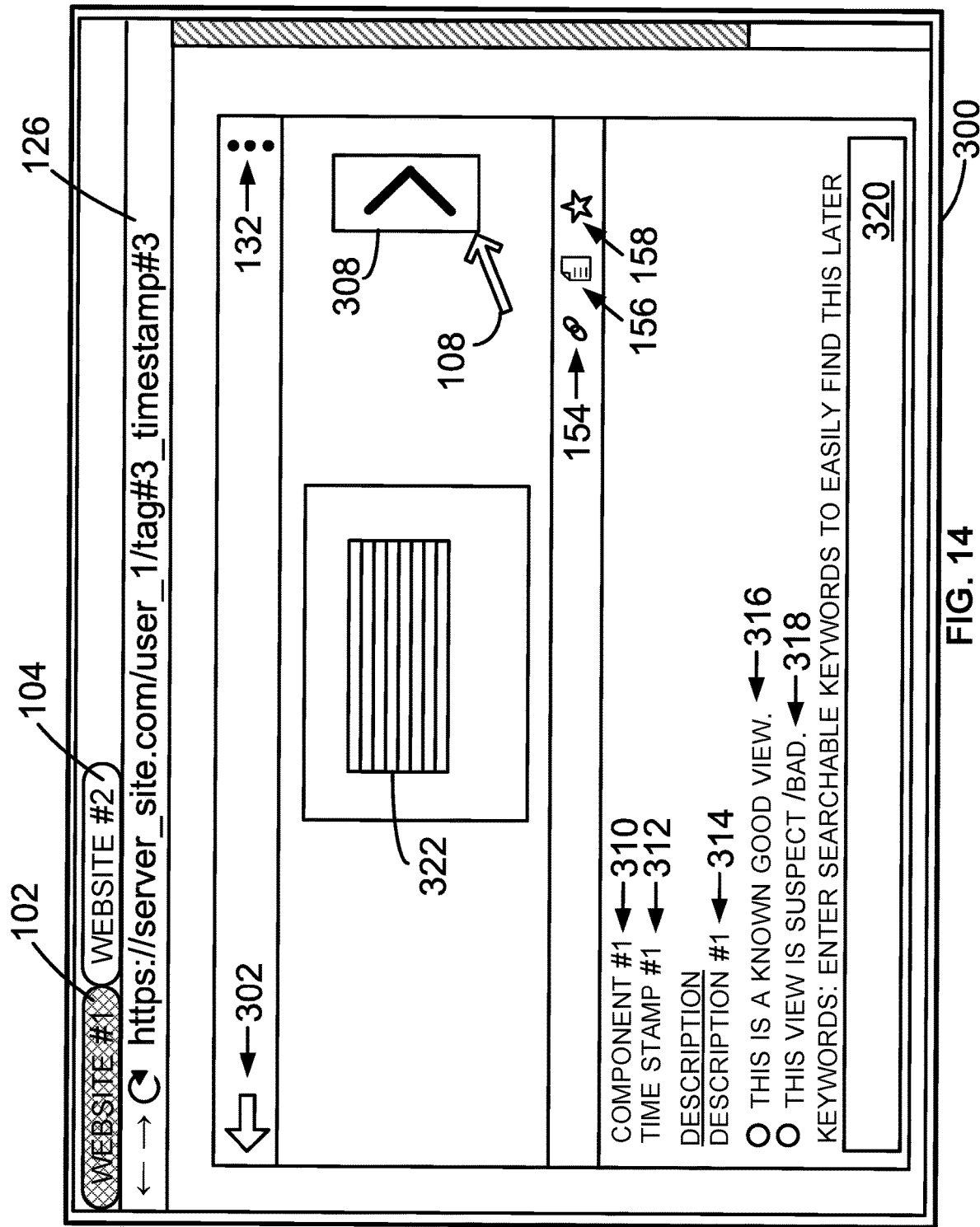
Figure 15:
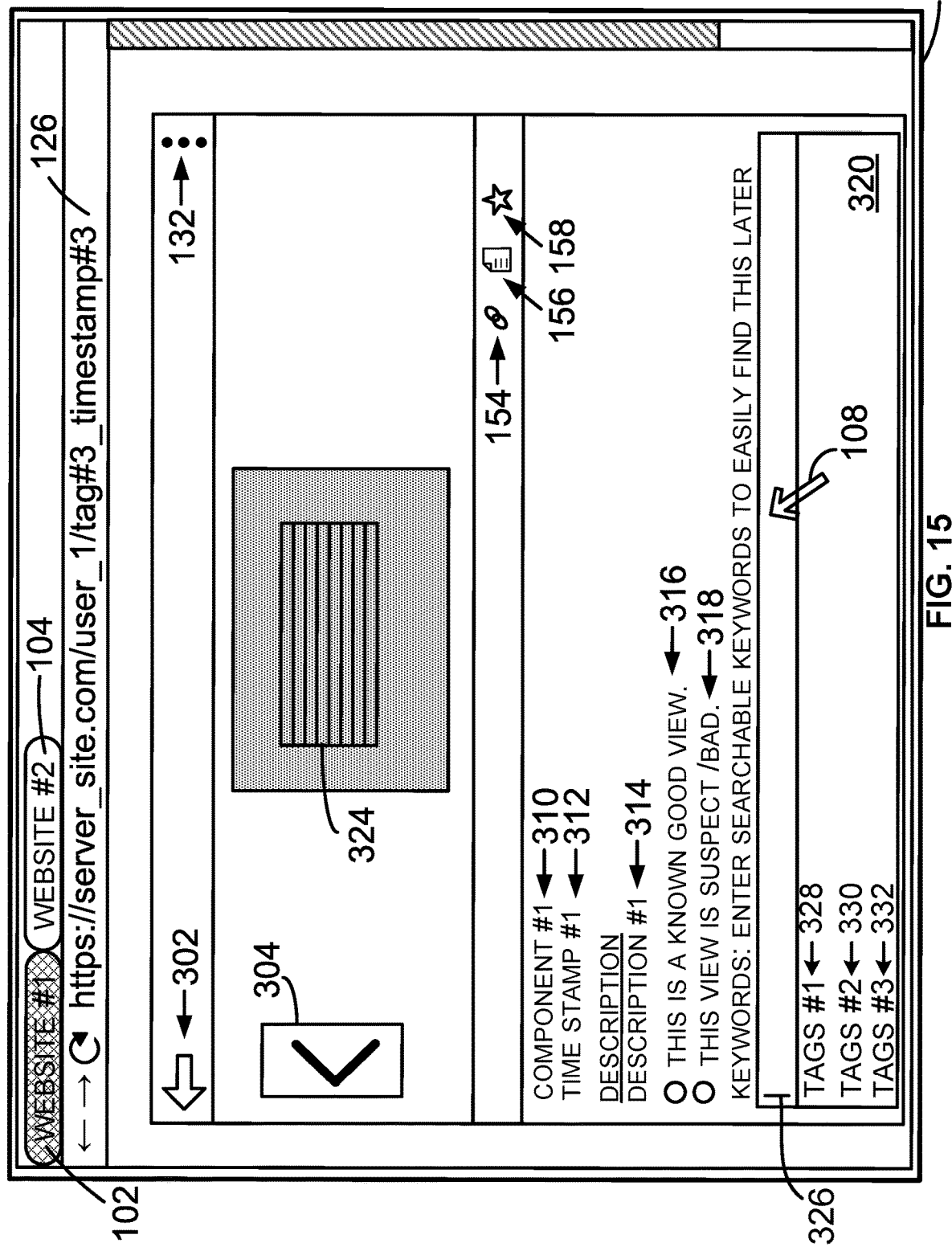
Figure 16:
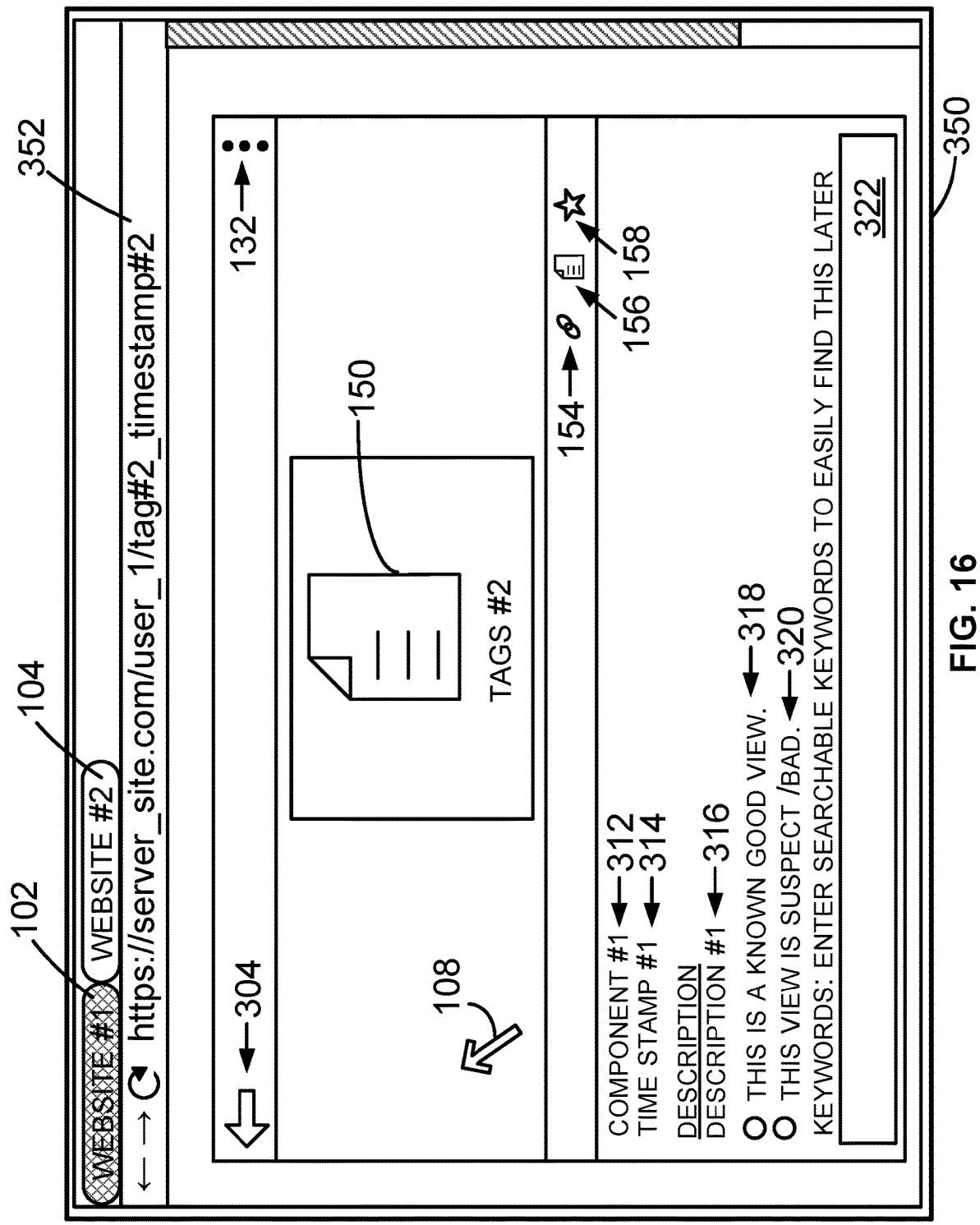

Next, FIG. 13, FIG. 14, and FIG. 15 show a web page 300 in accordance with the example implementations. The web browser 83 can output the web page 300 in response to selection of the card 110 from the web page 100 using the cursor 108. The web page 300 includes the web link bar 126 showing a uniform resource locator on the World Wide Web for accessing the web page 300. The web page 300 includes a back selector 302 selectable using the cursor 108 to cause the web browser 83 to display the web page from which the card 110 was selected to cause the web page 300 to be displayed.

The web page 300 shows the image 304 associated with the card 110 and a selector 306, 308 selectable to cause the web browser 83 to display a different content file associated with the card 110. As an example, the content file can include the image 304, such as a thermal image showing the air conditioning condenser shown in the image 148 described with respect to FIG. 6. As another example, selection of the selector 306 while the image 304 is shown on the web page 300 can cause the web page 300 to show a visible light image 322 (shown in FIG. 14) of the air conditioning condenser shown in the image 148 described with respect to FIG. 6. As yet another example, selection of the selector 308 while the image 304 is shown on the web page 300 can cause the web page 300 to show a blended image 324 (shown in FIG. 15) of the air conditioning condenser shown in the image 148 described with respect to FIG. 6

In at least some example implementations, the selector 306 can be removed from the web page 300 when no further content files are associated with being selectable via the selector 306. In those example implementations, the selector 308 can be selected to cause the web page to display a different content file until no further content files are associated with being selectable via the selector 308. In at least some example implementations, the selector 308 can be removed from the web page 300 when no further content files are associated with being selectable via the selector 308.

The web page 300 also includes an identifier 310, which like the identifier 128 shown in the card 110, can be indicative of a component, such as a component of an HVAC system. The web page also includes an identifier 312, which like the time stamp 130 shown in the card 110, can be indicative of when a content file associated with the card 110 was captured and/or generated. The web page 300 can include a description 314. FIG. 14 shows the description 314 as "description #1". As an example, the description #1 can represent a textual description such as "condenser leaking," "condenser passages plugged," or some other description associated with the content file(s) shown in the card 110.

The web page 300 includes a selector 316, 318 to classify the content file shown on the web page 300 as pertaining to a known good view or a suspected bad component. The web page 300 also includes a tag entry box 320 for entering text to generate tags to associate with the content file shown on the web page 300. Turning to FIG. 15, upon selecting the tag entry box 320 using the cursor 108, a cursor 326 appears within the tag entry box 320 to indicate where in the tag entry box 320 text characters will appear when entered using the keyboard 71. Moreover, upon selecting the tag entry box 320 using the cursor 108, a tag array 328, 330, 332 can populate the tag entry box 320. As an example, the tag array 328, 330, 332 can be one of a most-recently entered tag array, one of a most-recently searched tag array, or some other tag array.

VI. Example Vehicle

In accordance with the example implementations, a content file can, but need not necessarily, pertain to vehicle and be associated with a tag array pertaining to a vehicle.

A vehicle is a mobile machine that can be used to transport a person, people, and/or cargo. A vehicle can, but need not necessarily, be driven and/or otherwise guided along a path (e.g., a paved road or otherwise) on land, in water, in the air, and/or outer space. A vehicle can, but need not necessarily, be wheeled, tracked, railed, and/or skied. A vehicle can, but need not necessarily, include an automobile, a motorcycle, an all-terrain vehicle (ATV) defined by ANSI/SVIA-1-2007, a snowmobile, a personal watercraft (e.g., a JET SKI® personal watercraft), a light-duty truck, a medium-duty truck, a heavy-duty truck, a semi-tractor, a drone, and/or a farm machine. A vehicle can, but need not necessarily, include and/or use any appropriate voltage and/or current source, such as a battery, an alternator, a fuel cell, and the like, providing any appropriate current and/or voltage, such as about 12 volts, about 42 volts, and the like. A vehicle can, but need not necessarily, include and/or use any system and/or engine to provide its mobility. Those systems and/or engines can include vehicle components that use fossil fuels, such as gasoline, natural gas, propane, and the like, electricity, such as that generated by a battery, magneto, fuel cell, solar cell and the like, wind and hybrids and/or combinations thereof. A vehicle can, but need not necessarily, include an electronic control unit (ECU), a data link connector (DLC), and a vehicle communication bus that connects the DLC to the ECU. A vehicle can be configured to operate as an autonomous vehicle.

Some vehicles can be identified by characteristics of the vehicle such as characteristics indicative of when the vehicle was built (e.g., a vehicle year), who built the vehicle (e.g., a vehicle make), marketing names associated with vehicle (e.g., a vehicle model name, or more simply "model"), and features of the vehicle (e.g., an engine type). This description uses an abbreviation YMME and/or Y/M/M/E, where each letter in the order shown represents a model year, vehicle make, vehicle model name, and engine type, respectively. This description uses an abbreviation YMM and/or Y/M/M, where each letter in the order shown represents a model year, vehicle make, and vehicle model name, respectively. An example Y shown in the drawings is 2018/Toyota/Camry/4Cyl, in which "2018" represents the model year the vehicle was built, "Toyota" represents the name of the vehicle manufacturer Toyota Motor Corporation, Aichi Japan, "Camry" represents a vehicle model built by that manufacturer, and "4Cyl" represents a an engine type (i.e., a four cylinder internal combustion engine) within the vehicle. A person skilled in the art will understand that other features in addition to or as an alternative to "engine type" can be used to identify a vehicle. These other features can be identified in various manners, such as a regular production option (RPO) code, such as the RPO codes defined by the General Motors Company LLC, Detroit Mich. In some example implementations, the tag array(s) associated with a content file include one or more characteristic identifiers of a vehicle.

Some vehicles, such as automobiles, are associated with a unique vehicle identification number (VIN). Some VIN include seventeen alpha-numeric characters. Some of the characters for at least some VIN represent a YMME or a YMM. In some instances, a vehicle includes a one dimensional bar code indicative of a VIN associated with that vehicle. In some example implementations, the tag array(s) associated with a content file include one or more VIN characters and data representative of positions of the VIN characters in a VIN.

A vehicle communication bus within a vehicle can include one or more conductors (e.g., copper wire conductors) and/or can be wireless. As an example, a vehicle communication bus can include one or two conductors for carrying vehicle data messages in accordance with a vehicle data message (VDM) protocol. A VDM protocol can include a Society of Automotive Engineers (SAE) J1850 (PWM or VPW) VDM protocol, an International Organization of Standardization (ISO) 15764-4 controller area network (CAN) VDM protocol, an ISO 9141-2 K-Line VDM protocol, an ISO 14230-4 KWP2000 K-Line VDM protocol, or some other protocol presently defined for performing communications within a vehicle.

The DLC can include an on-board diagnostic (OBD) connector, such as an OBD II connector. An OBD II connector can include slots for retaining up to sixteen connector terminals, but can include a different number of slots or no slots at all. As an example, a DLC connector can include an OBD II connector that meets the SAE J1962 specification such as a connector 16M, part number 12110252, available from Aptiv LLC of Dublin, Ireland. The DLC can include conductor terminals that connect to a conductor in a vehicle. For instance, the DLC can include connector terminals that connect to conductors that respectively connect to positive and negative terminals of a vehicle battery. The DLC can include one or more conductor terminals that connect to a conductor of the vehicle communication bus such that the DLC is operatively connected to the ECU. The client computing system 24 can be operatively connected to the DLC in order to receive VDM from the vehicle. A content file generated by the client computing system 24, such as a content file including a vehicle service report, can, but need not necessarily, include data based on data carried in the VDM received from the vehicle. The data carried in the VDM can, but need not necessarily, include a parameter identifier (PID) and data (PID data) parameters associated with the PID. The data carried in the VDM can, but need not necessarily, include a DTC.

An ECU can control various aspects of vehicle operation and/or components within a vehicle. For example, the ECU can include a powertrain (PT) system ECU, an engine control module (ECM) ECU, a supplemental inflatable restraint (SIR) system (i.e., an air bag system) ECU, an entertainment system ECU, or some other ECU. The ECU can receive inputs (e.g., a sensor input), control output devices (e.g., a solenoid), generate a vehicle data message (VDM) (such as a VDM based on a received input or a controlled output), and set a diagnostic trouble code (DTC) to a particular state (such as active or history).

VII. Conclusion

It should be understood that the arrangements described herein and/or shown in the drawings are for purposes of example only and are not intended to be limiting. As such, those skilled in the art will appreciate that other arrangements and elements (e.g., machines, interfaces, functions, orders, and/or groupings of functions) can be used instead, and some elements can be omitted altogether. Furthermore, various functions described and/or shown in the drawings as being performed by one or more elements can be carried out by a processor executing computer-readable program instructions or by a combination of hardware, firmware, and/or software. For purposes of this description, execution of CRPI contained in some computer-readable medium to perform some function can include executing all of the program instructions of those CRPI or only a portion of those CRPI.

While various aspects and implementations are described herein, other aspects and implementations will be apparent to those skilled in the art. The various aspects and implementations disclosed herein are for purposes of illustration and are not intended to be limiting, with the true scope being indicated by the claims, along with the full scope of equivalents to which such claims are entitled. It is also to be understood that the terminology used herein for the purpose of describing particular implementations only, and is not intended to be limiting.

In this description, the articles "a," "an," and "the" are used to introduce elements and/or functions of the example implementations. The intent of using those articles is that there is one or more of the introduced elements and/or functions.

In this description, the intent of using the term "and/or" within a list of at least two elements or functions and the intent of using the terms "at least one of," "at least one of the following," "one or more of," and "one or more of the following" immediately preceding a list of at least two components or functions is to cover each implementation including a listed component or function independently and each implementation including a combination of the listed components or functions. For example, an implementation described as including A, B, and/or C, or at least one of A, B, and C, or at least one of: A, B, and C, or at least one of A, B, or C, or at least one of: A, B, or C, or one or more of A, B, and C, or one or more of: A, B, and C, or one or more of A, B, or C, or one or more of: A, B, or C is intended to cover each of the following possible implementations: (i) an implementation including A, but not B and not C, (ii) an implementation including B, but not A and not C, (iii) an implementation including C, but not A and not B, (iv) an implementation including A and B, but not C, (v) an implementation including A and C, but not B, (vi) an implementation including B and C, but not A, and/or (vi) an implementation including A, B, and C. For the implementations including component or function A, the implementations can include one A or multiple A. For the implementations including component or function B, the implementations can include one B or multiple B. For the implementations including component or function C, the implementations can include one C or multiple C. The use of ordinal numbers such as "first," "second," "third" and so on is to distinguish respective elements rather than to denote a particular order of those elements unless the context of using those terms explicitly indicates otherwise. The use of the symbol "$" as prefix to a number indicates the number is a hexadecimal number.

Implementations of the present disclosure may thus relate to one of the enumerated example embodiments (EEEs) listed below.

EEE 1 is a method comprising: receiving, by a client computing system from a server computing system, a web page and a first set of content files, wherein the first set of content files includes a first quantity of content files within a range of one content file to a threshold number of content files, and wherein the client computing system is configured to execute a web browser; displaying, on a display of the client computing system, the web page, wherein the web page includes a search bar and a first set of one or more cards, wherein each card of the first set of one or more cards includes one or more content files of the first set of content files; transmitting, by the client computing system while displaying the web page, a first indicator to the server computing system, wherein the first indicator indicates the search bar on the web page at the client computing system was selected; receiving, by the client computing system in response to transmitting the first indicator, one or more tags arrays associated with a second set of content files, wherein the second set of content files includes a second quantity of content files within the range of one content file to the threshold number of content files; displaying, on the display, the one or more tags arrays within an expanded portion of the search bar, wherein the one or more tag arrays include a first tag array associated with one or more content files among the second set of content files; transmitting, by the client computing system, a second indicator to the server computing system, wherein the second indicator indicates the first tag array was selected from within the expanded portion of the search bar; receiving, by the client computing system, a third set of content files for populating one or more cards on the web page to generate a modified web page, wherein the third set of content files includes a third quantity of content files within a range of one content file to the threshold number of content files, and wherein each content file of the third set of content files includes a content file most-recently downloaded to the server computing system and associated with the first tag array; and displaying, on the display, the modified web page, wherein displaying the modified web page includes displaying on the display a second set of one or more cards, wherein each card of the second set of one or more cards includes one or more content files of the third set of content files.

EEE 2 is the method of EEE 1, further comprising: receiving, by the client computing system from the server computing system, respective metadata for each content file of the first set of content files, wherein the respective metadata for each content file includes a timestamp associated with that content file, and wherein the respective metadata for a first content file of the first set of content files includes a tag array associated with the first content file of the first set of content files, wherein displaying the web page includes displaying the one or more cards in an order based on a timestamp of at least one content file included within each of the one or more cards, and wherein displaying the web page includes displaying the tag array associated with the first content file within a card including the first content file.

EEE 3 is the method of EEE 1 or 2, wherein the first set of content files and the second set of content files are identical.

EEE 4 is the method of any one of EEE 1 to 3, wherein the first tag array includes a vehicle year tag, a vehicle make tag, and/or a vehicle model tag.

EEE 5 is the method of any one of EEE 1 to 4, wherein each content file of the first set of content files includes a content file among a set of content files most-recently downloaded to the server computing system and wherein a quantity of content files in the set of content files most-recently downloaded to the server computing system equals the first quantity of content files, and/or wherein each content file of the second set of content files includes a content file among the set of content files most-recently downloaded to the server computing system and wherein a quantity of content files in the set of content files most-recently downloaded to the server computing system equals the second quantity of content files.

EEE 6 is the method of any one of EEE 1 to 5, further comprising: transmitting, from the client computing system to the server computing system, a request for the web page associated with a single account, wherein each content file of the first set of content files is associated with the single account; wherein each content file of the second set of content files is associated with the single account; and wherein each content file of the third set of content files is associated with the single account or with multiple accounts.

EEE 7 is the method of any one of EEE 1 to 6, further comprising: transmitting, by the client computing system, a third indicator to the server computing system, wherein the third indicator indicates one or more characters has been entered into the search bar using a keyboard of the client computing system; receiving, by the client computing system, a type-ahead search term entered during each of a quantity of most-recent searches based on typed characters, wherein the quantity of most-recent searches based on typed characters is less than or equal to a threshold number of most-recent searches based on typed characters, and wherein the type-ahead search term entered during each of the quantity of most-recent searches begin with the one or more characters indicated by the third indicator; and displaying, on the display, the type-ahead search term entered during each of the quantity of most-recent searches based on typed characters for use in populating the expanded portion of the search bar at the client computing system with the type-ahead search term entered during each of the quantity of most-recent searches based on typed characters instead of or in addition to the one or more tag arrays.

EEE 8 is the method of any one of EEE 1 to 7, further comprising: displaying, on the display, a share selector on an individual card displayed on the web page or on the modified web page; displaying, on the display after selection of the share selector, a graphical user interface configured for entering selections for sharing the individual card with an entity; determining, by the client computing system, a selection of an entity and an application to generate a message entered using the graphical user interface; generating, by client computing system using the application, a message populated with a link from which a device can request at least a portion of one or more content files associated with the individual card; and transmitting, by the client computing system, the message to a network for transmission to the device.

EEE 9 is the method of EEE 8, wherein the data to populate in the graphical user interface includes a name of one or more entities and an indicator of at least one application for generating the message, and wherein the at least one application includes at least one of the following: an e-mail message application, a short-message-service message application, or a multi-media-service message application.

EEE 10 is the method of any one of EEE 1 to 9, wherein one or more content files among the first set of content files, the second set of content files, and/or the third set of content files includes a visible light image file, a thermal image file, a blended image file, or a file having a PDF extension or an XML extension.

EEE 11 is the method of any one of EEE 1 to 10, further comprising: expanding a size of the search bar so that an entirety of the one or more tag arrays can be displayed within the search bar.

EEE 12 is the method of any one of EEE 1 to 11, further comprising: receiving, by the client computing system from the server computing system, a quantity of prior search text strings within a range of one prior search text string to a threshold number of prior search text strings; and displaying, on the display, the quantity of prior search text stings within the search bar while displaying the one or more tag arrays within the search bar.

EEE 13 is a computing system comprising: a display; a computer-readable memory having stored thereon a web browser; and one or more processors configured to execute the web browser and programmed to: receive, from a server computing system, a web page and a first set of content files, wherein the first set of content files includes a first quantity of content files within a range of one content file to a threshold number of content files; display the web page on the display, wherein the web page includes a search bar and a first set of one or more cards, wherein each card of the first set of one or more cards includes one or more content files of the first set of content files; transmit, while displaying the web page, a first indicator to the server computing system, wherein the first indicator indicates the search bar on the web page at the client computing system was selected; receive, in response to transmitting the first indicator, one or more tags arrays associated with a second set of content files, wherein the second set of content files includes a second quantity of content files within the range of one content file to the threshold number of content files; display, on the display, the one or more tags arrays within an expanded portion of the search bar, wherein the one or more tag arrays include a first tag array associated with one or more content files among the second set of content files; transmit a second indicator to the server computing system, wherein the second indicator indicates the first tag array was selected from within the expanded portion of the search bar; receive a third set of content files for populating one or more cards on the web page to generate a modified web page, wherein the third set of content files includes a third quantity of content files within a range of one content file to the threshold number of content files, and wherein each content file of the third set of content files includes a content file most-recently downloaded to the server computing system and associated with the first tag array; and display, on the display, the modified web page, wherein displaying the modified web page includes displaying on the display a second set of one or more cards, wherein each card of the second set of one or more cards includes one or more content files of the third set of content files.

EEE 14 is a computing system comprising: a display; a computer-readable memory having stored thereon a web browser; and one or more processors configured to execute the web browser and programmed to perform a method of any one of EEE 1 to 12.

EEE 15 is a computer readable medium having stored thereon instructions executable by one or more processors to cause a computing system to perform functions comprising: receiving, from a server computing system, a web page and a first set of content files, wherein the first set of content files includes a first quantity of content files within a range of one content file to a threshold number of content files, and wherein the client computing system is configured to execute a web browser; displaying, on a display, the web page, wherein the web page includes a search bar and a first set of one or more cards, wherein each card of the first set of one or more cards includes one or more content files of the first set of content files; transmitting, while displaying the web page, a first indicator to the server computing system, wherein the first indicator indicates the search bar on the web page at the client computing system was selected; receiving, in response to transmitting the first indicator, one or more tags arrays associated with a second set of content files, wherein the second set of content files includes a second quantity of content files within the range of one content file to the threshold number of content files; displaying, on the display, the one or more tags arrays within an expanded portion of the search bar, wherein the one or more tag arrays include a first tag array associated with one or more content files among the second set of content files; transmitting a second indicator to the server computing system, wherein the second indicator indicates the first tag array was selected from within the expanded portion of the search bar; receiving a third set of content files for populating one or more cards on the web page to generate a modified web page, wherein the third set of content files includes a third quantity of content files within a range of one content file to the threshold number of content files, and wherein each content file of the third set of content files includes a content file most-recently downloaded to the server computing system and associated with the first tag array; and displaying, on the display, the modified web page, wherein displaying the modified web page includes displaying on the display a second set of one or more cards, wherein each card of the second set of one or more cards includes one or more content files of the third set of content files.

EEE 16 is a computer readable medium having stored thereon instructions executable by one or more processors to cause a computing system to perform a method of any one of EEE 1 to 12.

EEE 17 is a method comprising: receiving, by a server computing system from a client computing system, a request for a web page, wherein the web page is configured to display a search bar and one or more cards for presenting a number of content files ranging from one content file to a threshold number of content files; determining, by the server computing system, a first set of content files for use in populating the one or more cards on the web page, wherein the first set of content files includes a first quantity of content files within a range of one content file to the threshold number of content files; transmitting, by the server computing system to the client computing system in response to receiving the request, the web page and the first set of content files for use in populating the one or more cards on the web page; receiving, by the server computing system, a first indicator, wherein the first indicator indicates the search bar was selected on the web page at the client computing system; determining, by the server computing system, one or more tags arrays associated with a second set of content files, wherein the second set of content files includes a second quantity of content files within the range of one content file to the threshold number of content files; transmitting, by the server computing system to the client computing system in response to receiving the first indicator, the one or more tag arrays for displaying within an expanded portion of the search bar, wherein the one or more tag arrays include a first tag array associated with one or more content files among the second set of content files; receiving, by the server computing system, a second indicator from the client computing system, wherein the second indicator indicates the first tag array was selected from within the expanded portion of the search bar; determining, by the server computing system, a third set of content files for populating one or more cards on the web page to generate a modified web page, wherein the third set of content files includes a third quantity of content files within a range of one content file to the threshold number of content files, and wherein each content file of the third set of content files includes a content file most-recently downloaded to the server computing system and associated with the first tag array; and transmitting, by the server computing system to the client computing system in response to receiving the second indicator, the third set of content files for populating the one or more cards on the web page to generate the modified web page at the client computing system.

EEE 18 is the method of EEE 17, wherein the first set of content files and the second set of content files are identical.

EEE 19 is the method of EEE 17 or 18, wherein each content file of the first set of content files includes a content file among a set of content files most-recently downloaded to the server computing system and wherein a quantity of content files in the set of content files most-recently downloaded to the server computing system equals the first quantity of content files, and/or wherein each content file of the second set of content files includes a content file among the set of content files most-recently downloaded to the server computing system and wherein a quantity of content files in the set of content files most-recently downloaded to the server computing system equals the second quantity of content files.

EEE 20 is the method of any one of EEE 17 to 19, further comprising: receiving, by the server computing system before receiving the request for the web page, one or more content files and, for each content file of the one or more content files, metadata associated with that content file, wherein the metadata associated with each of at least some of the one or more content files includes a tag array.

EEE 21 is the method of any one of EEE 17 to 20, wherein the request for the web page is associated with a single account, wherein determining the first set of content files includes determining each content file of the first set of content files is associated with the single account; wherein determining the one or more tag arrays associated with the second set of content files includes determining each content file of the second set of content files is associated with the single account; and wherein determining the third set of content files includes determining each content file of the third set of content files is associated with the single account.

EEE 22 is the method of any one of EEE 17 to 21, further comprising: receiving, by the server computing system, a third indicator from the client computing system, wherein the third indicator indicates one or more characters has been entered into the search bar using a keyboard at the client computing system; determining, by the server computing system, a type-ahead search term entered during each of a quantity of most-recent searches based on typed characters, wherein the quantity of most-recent searches based on typed characters is less than or equal to a threshold number of most-recent searches based on typed characters, and wherein the type-ahead search term entered during each of the quantity of most-recent searches begin with the one or more characters indicated by the third indicator; and transmitting, by the server computing system to the client computing system in response to receiving the third indicator, the type-ahead search term entered during each of the quantity of most-recent searches based on typed characters for use in populating the expanded portion of the search bar at the client computing system with the type-ahead search term entered during each of the quantity of most-recent searches based on typed characters instead of or in addition to the one or more tag arrays.

EEE 23 is the method of any one of EEE 17 to 22, further comprising: receiving, by the server computing system, a fourth indicator from the client computing system, wherein the fourth indicator indicates a share selector associated with an individual card displayed on the web page or the modified web page has been selected; determining, by the server computing system, data to populate in a graphical user interface on the web page, wherein the graphical user interface is configured for entering selections for sharing the individual card with an entity; transmitting, by the server computing system to the client system in response to receiving the fourth indicator, the data to populate in the graphical user interface on the web page; receiving, by the server computing system, a fifth indicator from the client computing system, wherein the fifth indicator indicates a selection of an entity and an application to generate a message; generating, by the server computing system, a message populated with a link from which a device can request at least a portion of one or more content files associates with the individual card; and transmitting, by the server computing system, the message to a network for transmission to the device.

EEE 24 is the method of EEE 23, wherein the data to populate in the graphical user interface includes a name of one or more entities and an indicator of at least one application for generating the message, and wherein the at least one application includes at least one of the following: an e-mail message application, a short-message-service message application, or a multi-media-service message application.

EEE 25 is the method of any one of EEE 17 to 24, wherein a distinct card displayed on the web page or on the modified web page includes a shop file selector, and wherein one or more content files are associated with the distinct card, the method further comprising: receiving, by the server computing system a sixth indicator indicating the shop file selector was selected from the distinct card; and storing, by the server computing system in response to receiving the sixth indicator, a permanent link for accessing the one or more content files associated with the distinct card.

EEE 26 is the method of any one of EEE 17 to 25, wherein determining the one or more tag arrays includes excluding a tag array identical to a tag array of the one or more tag arrays and/or excluding a tag array associated with a content file received by the server computing system after receiving each content file associated with a respective tag array of the one or more tag arrays.

EEE 27 is the method of any one of EEE 17 to 26, wherein the server computing system includes a first web server and a second web server, wherein receiving the first indicator includes the first web server receiving the first indicator, wherein determining the one or more tags arrays includes: transmitting, by the first web server to the second web server, a file list request; receiving, by the first web server from the second web server, a response to the file list request including a name of each content file of the second set of content files and respective metadata regarding each content file of the second set of content files, wherein the respective metadata regarding each content file includes a respective time stamp and a respective tag array if that content file is associated with a tag array of the one or more tag arrays; and determining, by the first web server, the one or more tag arrays do not include any duplicate tag arrays and the one or more tag arrays are associated with respective content files that are associated with a tag array and a latest time stamp.

EEE 28 is the method of any one of EEE 17 to 27, wherein one or more content files among the first set of content files, the second set of content files, and/or the third set of content files includes a visible light image file, a thermal image file, a blended image file, or a file having a PDF extension or an XML extension.

EEE 29 is a computing system comprising: a computer-readable memory having stored thereon a database; and one or more processors configured to access the database and programmed to: receive, from a client computing system, a request for a web page, wherein the web page is configured to display a search bar and one or more cards for presenting a number of content files ranging from one content file to a threshold number of content files; determine a first set of content files for use in populating the one or more cards on the web page, wherein the first set of content files includes a first quantity of content files within a range of one content file to the threshold number of content files; transmit, to the client computing system in response to receiving the request, the web page and the first set of content files for use in populating the one or more cards on the web page; receive a first indicator, wherein the first indicator indicates the search bar was selected on the web page at the client computing system; determine one or more tags arrays associated with a second set of content files, wherein the second set of content files includes a second quantity of content files within the range of one content file to the threshold number of content files; transmit, to the client computing system in response to receiving the first indicator, the one or more tag arrays for displaying within an expanded portion of the search bar, wherein the one or more tag arrays include a first tag array associated with one or more content files among the second set of content files; receive a second indicator from the client computing system, wherein the second indicator indicates the first tag array was selected from within the expanded portion of the search bar; determine a third set of content files for populating one or more cards on the web page to generate a modified web page, wherein the third set of content files includes a third quantity of content files within a range of one content file to the threshold number of content files, and wherein each content file of the third set of content files includes a content file most-recently downloaded to the server computing system and associated with the first tag array; and transmit, to the client computing system in response to receiving the second indicator, the third set of content files for populating the one or more cards on the web page to generate the modified web page at the client computing system.

EEE 30 is a computing system comprising: a computer-readable memory having stored thereon a database; and one or more processors configured to perform a method of any one of EEE 17 to 28.

EEE 31 is a computer readable medium having stored thereon instructions executable by one or more processors to cause a computing system to perform functions comprising: receiving, from a client computing system, a request for a web page, wherein the web page is configured to display a search bar and one or more cards for presenting a number of content files ranging from one content file to a threshold number of content files; determining a first set of content files for use in populating the one or more cards on the web page, wherein the first set of content files includes a first quantity of content files within a range of one content file to the threshold number of content files; transmitting, to the client computing system in response to receiving the request, the web page and the first set of content files for use in populating the one or more cards on the web page; receiving a first indicator, wherein the first indicator indicates the search bar was selected on the web page at the client computing system; determining one or more tags arrays associated with a second set of content files, wherein the second set of content files includes a second quantity of content files within the range of one content file to the threshold number of content files; transmitting, to the client computing system in response to receiving the first indicator, the one or more tag arrays for displaying within the expanded portion of the search bar, wherein the one or more tag arrays include a first tag array associated with one or more content files among the second set of content files; receiving a second indicator from the client computing system, wherein the second indicator indicates the first tag array was selected from within the expanded portion of the search bar; determining a third set of content files for populating one or more cards on the web page to generate a modified web page, wherein the third set of content files includes a third quantity of content files within a range of one content file to the threshold number of content files, and wherein each content file of the third set of content files includes a content file most-recently downloaded to the server computing system and associated with the first tag array; and transmitting, to the client computing system in response to receiving the second indicator, the third set of content files for populating the one or more cards on the web page to generate the modified web page at the client computing system.

EEE 16 is a computer readable medium having stored thereon instructions executable by one or more processors to cause a computing system to perform a method of any one of EEE 17 to 28.

What is claimed is:

1. A method comprising:
displaying, on a display of a client computing system, a first content file within a first web page that was obtained using a web browser application operating at the client computing system;
displaying a second content file within the first web page while displaying the first content file within the first web page;
identifying, by the client computing system, a number of tag arrays, including a first tag array, associated with content files most recently downloaded to the client computing system;
displaying, on the display of the client computing system, the first tag array within the first web page, wherein the first tag array includes one or more tags corresponding to a third content file other than the first content file;
receiving, at the client computing system, a selection of the first tag array while the first content file and the second content file are displayed within the first web page; and
adding the one or more tags corresponding to the third content file to metadata corresponding to the first content file and to metadata corresponding to the second content file.

2. The method according to claim 1, wherein the metadata corresponding to the first content file is separate from the first content file.

3. The method according to claim 1, further comprising:
displaying, on the display of the client computing system, one or more other tag arrays within the first web page, wherein each tag array of the one or more other tag arrays includes one or more tags associated with a respective content file other than the first content file and other than the third content file.

4. The method according to claim 3, wherein:
the first web page includes a tag entry box and a cursor, and
the first tag array and the one or more other tag arrays are initially displayed within the first web page after the cursor is moved into the tag entry box.

5. The method according to claim 4, wherein displaying the first tag array and the one or more other tag arrays within the first web page includes displaying the one or more other tag arrays within the tag entry box.

6. The method according to claim 3, wherein none of the first tag array and the one or more other tags arrays is duplicative.

7. The method according to claim 1, wherein the first content file includes an image file.

8. The method according to claim 7, further comprising:
displaying, on the display, a selector; and
classifying, in response to a selection of the selector, the first content file as pertaining to a known good view or a suspected bad component.

9. The method according to claim 1, wherein the first content file includes a file having a PDF extension or an XML extension.

10. The method according to claim 1, further comprising:
displaying, on the display of the client computing system before displaying the first content file within the first web page, a second web page including a display card corresponding to the first content file; and
determining, at the client computing system while displaying the second web page, a selection of the display card has occurred,
wherein displaying the first content file within the first web page occurs in response to determining the selection of the display card has occurred.

11. The method according to claim 10, wherein:
the display card further corresponds to a third content file, and the method further comprises:
displaying, within the first web page on the display of the client computing system, a selector selectable to cause the third content file to be displayed within the first web page;
displaying, within the first web page on the display of the client computing system, one or more tag arrays including one or more tags, wherein the one or more tag arrays include a particular tag array;
receiving, at the client computing system, a selection of a particular tag array while the third content file is displayed within the first web page; and
adding the one or more tags of the particular tag array to metadata corresponding to the third content file.

12. The method according to claim 10, wherein:
the second web page includes a modified version of a third web page,
the third web page includes a search bar, and
the method further comprises:
receiving, by the client computing system, one or more text characters entered within the search bar;
displaying, on the display, one or more prior text entries that begin with the one or more text characters entered within the search bar; and
receiving, by the client computing system, a selection of a first prior text entry of the one or more prior text entries, wherein modification of the third web page is based on the selection of the first prior text entry, and the second web page include one or more display cards corresponding to a content file that is associated with a tag array that includes a tag starting with the first prior text entry.

13. The method according to claim 1, wherein the first tag array includes one or more from among: a vehicle year tag, a vehicle make tag, or a vehicle model tag.

14. The method according to claim 1, wherein the first tag array includes a tag indicative of a diagnostic and information system.

15. The method according to claim 1, wherein the first tag array includes a tag indicative of a vehicle identification number.

16. The method according to claim 1, wherein the first tag array includes a tag indicative of a symptom pertaining to a vehicle and/or a component on the vehicle.

17. A computing system comprising:
a non-transitory computer-readable medium;
a display;
one or more processors; and
program instructions stored on the non-transitory computer-readable medium and executable by the one or more processors to carry out functions including:
displaying, on the display, a first content file within a first web page that was obtained using a web browser application operating at the computing system;

displaying a second content file within the first web page while displaying the first content file within the first web page;

identifying a number of tag arrays, including a first tag array, associated with content files most recently downloaded to the computing system;

displaying, on the display, the first tag array within the first web page, wherein the first tag array includes one or more tags corresponding to a third content file other than the first content file;

receiving, at the computing system, a selection of the first tag array while the first content file and the second content file are displayed within the first web page; and adding the one or more tags corresponding to the third content file to metadata corresponding to the first content file and to metadata corresponding to the second content file.

18. The computing system according to claim 17, wherein:

the functions further include displaying, on the display, one or more other tag arrays within the first web page, wherein each tag array of the one or more other tag arrays includes one or more tags associated with a respective content file other than the first content file and other than the third content file, the first tag array and the one or more other tag arrays are part of a group of tag arrays including one or more additional tag arrays, each tag array of the group of tag arrays is associated with a date, the date being indicative of when a corresponding content file was generated and/or when the corresponding content file was received by a server computing system, and the date associated with the first tag array and the date associated with each content file corresponding to a tag array of the one or more other tag arrays is more recent than the date associated with each tag array of the one or more additional tag arrays.

19. The computing system according to claim 17, wherein the functions further include:

displaying, on the display before displaying the first content file within the first web page, a second web page including a display card corresponding to the first content file; and determining, at the computing system while displaying the second web page, a selection of the display card has occurred, and wherein displaying the first content file within the first web page occurs in response to determining the selection of the display card has occurred.

20. The computing system according to claim 17, wherein the first tag array includes one or more from among a vehicle year tag, a vehicle make tag, a vehicle model tag, a tag indicative of a diagnostic and information system, or a tag indicative of a vehicle identification number.

21. A non-transitory computer-readable medium having stored thereon instructions executable by at least one processor to cause a computing system to perform functions including:

displaying, on a display of the computing system, a first content file within a first web page that was obtained using a web browser application operating at the computing system;

displaying a second content file within the first web page while displaying the first content file within the first web page;

identifying a number of tag arrays, including a first tag array, associated with content files most recently downloaded to the computing system;

displaying, on the display of the computing system, the first tag array within the first web page, wherein the first tag array includes one or more tags corresponding to a third content file other than the first content file;

receiving, at the computing system, a selection of the first tag array while the first content file and the second content file are displayed within the first web page; and adding the one or more tags corresponding to the third content file to metadata corresponding to the first content file and to metadata corresponding to the second content file.

22. The method of claim 1, wherein the first tag array includes a tag indicative of a symptom pertaining to a component of a vehicle.

23. The method of claim 1, wherein the one or more tags include two or more first tags, the method further comprising displaying, on the display of the client computing system while the first tag array is displayed, a second tag array within the first web page, the second tag array including two or more second tags.

24. The method of claim 1, further comprising identifying a number of most recently searched tag arrays based on characters entered using the client computing system, wherein the number of most recently searched tag arrays includes the first tag array.

25. The method of claim 24, wherein the first tag array is a most recently searched tag array.

26. The method of claim 1, further comprising identifying a number of tag arrays most recently entered for association with a content file based on characters entered using the client computing system, wherein the number of tag arrays most recently entered for association includes the first tag array.

27. The method of claim 26, wherein the first tag array is a tag array most recently entered for association with a content file.

28. The method of claim 1, wherein the first content file represents a visible light image and the second content file represents a thermal image.

29. The method of claim 28, wherein displaying the first content file and displaying the second content file comprises displaying a blended image that includes information from both the visible light image and the thermal image.

30. The method of claim 1, wherein the first tag array is associated with a content file most recently downloaded to the client computing system.

31. A method comprising:

displaying, on a display of a client computing system, a first content file within a first web page that was obtained using a web browser application operating at the client computing system;

displaying a second content file within the first web page while displaying the first content file within the first web page;

identifying, by the client computing system, a number of tag arrays, including a first tag array, associated with content files most recently received by a server computing system;

displaying, on the display of the client computing system, the first tag array within the first web page, wherein the first tag array includes one or more tags corresponding to a third content file other than the first content file;

receiving, at the client computing system, a selection of the first tag array while the first content file and the second content file are displayed within the first web page; and adding the one or more tags corresponding to the third content file to metadata corresponding to the first content file and to metadata corresponding to the second content file.

32. The method of claim 31, wherein the first tag array is associated with a content file most recently received by the server computing system.

* * * * *